US008271348B2

(12) United States Patent
Rise et al.

(10) Patent No.: US 8,271,348 B2
(45) Date of Patent: Sep. 18, 2012

(54) METHODS AND SYSTEM FOR CONSUMABLE ORDER CREATION

(75) Inventors: James D. Rise, Lake Oswego, OR (US); Brent Stuart Deuth, Tigard, OR (US); Christopher Dale Iburg, Government Camp, OR (US); Charles Robert Carlson, Beaverton, OR (US); James Patrick VanWinkle, West Linn, OR (US); Shanti Villarreal, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 379 days.

(21) Appl. No.: 12/697,174

(22) Filed: Jan. 29, 2010

(65) Prior Publication Data

US 2011/0191198 A1 Aug. 4, 2011

(51) Int. Cl.
G06Q 30/00 (2006.01)

(52) U.S. Cl. .................... 705/26.35; 705/27.1; 705/302; 705/304

(58) Field of Classification Search ................ 347/7, 19; 705/26.1, 14.1, 26.7
See application file for complete search history.

(56) References Cited

U.S. PATENT DOCUMENTS

| | | | |
|---|---|---|---|
| 5,146,344 A | 9/1992 | Bennett et al. | |
| 5,563,999 A | 10/1996 | Yaksich et al. | |
| 6,076,076 A | 6/2000 | Gottfreid | |
| 6,202,155 B1 | 3/2001 | Tushie et al. | |
| 6,357,942 B1 | 3/2002 | Adkins et al. | |
| 6,373,587 B1 | 4/2002 | Sansone | |
| 6,452,512 B1 | 9/2002 | Adkins et al. | |
| 6,471,319 B1 | 10/2002 | Adkins et al. | |
| 6,523,924 B1 | 2/2003 | Adkins et al. | |
| 6,525,837 B1 | 2/2003 | Adkins et al. | |
| 6,567,015 B2 | 5/2003 | Adkins et al. | |
| 6,600,150 B1 | 7/2003 | Adkins et al. | |
| 6,600,151 B2 | 7/2003 | Adkins et al. | |
| 6,609,781 B2 | 8/2003 | Adkins et al. | |
| 6,616,261 B2 | 9/2003 | Adkins et al. | |

(Continued)

FOREIGN PATENT DOCUMENTS

JP 2002215374 8/2002

(Continued)

OTHER PUBLICATIONS

Hamm, Steven, "Rivals Say HP Is Using Hardball Tactics", Business Week. New York: Feb. 19, 2007. , Iss. 4022; p. 48.*

(Continued)

Primary Examiner — Mark Fadok
(74) Attorney, Agent, or Firm — Fay Sharpe LLP

(57) ABSTRACT

Systems and methods are presented for generating consumable orders for document processing devices and for verifying approved source consumable usage in document processing devices, in which a customer computer receives electronic reports from the devices and from these ascertains whether particular devices will need replacement consumables and also whether non-program consumable products are being used in particular devices. If a replacement will be required, the customer computer presents a proposed order to the customer via prompting content customizable by a reseller. The customer can then accept, modify, or reject the proposed order, and any accepted or modified order is forwarded to an account manager system for automatic placement for consumable shipment from a manufacturer or distributor. If the device has a non-program consumable installed, the customer computer notifies the account manager system and may warn the customer that continued usage may void one or more warranty extensions or other program incentive.

29 Claims, 17 Drawing Sheets

U.S. PATENT DOCUMENTS

| | | | |
|---|---|---|---|
| 6,624,407 B1 | 9/2003 | Adkins et al. |
| 6,626,513 B2 | 9/2003 | Adkins et al. |
| 6,631,971 B2 | 10/2003 | Adkins et al. |
| 6,637,961 B1 | 10/2003 | Adkins et al. |
| 6,655,777 B2 | 12/2003 | Adkins et al. |
| 6,660,996 B1 | 12/2003 | Adkins et al. |
| 6,763,336 B1 | 7/2004 | Kolls |
| 6,768,427 B1 | 7/2004 | Adkins et al. |
| 6,768,558 B1 | 7/2004 | Yamashita et al. |
| 6,823,133 B1 | 11/2004 | Adkins et al. |
| 6,826,547 B1 | 11/2004 | Silverbrook et al. |
| 6,830,399 B2 | 12/2004 | Adkins et al. |
| 6,843,547 B2 | 1/2005 | Adkins et al. |
| 6,865,241 B1 | 3/2005 | Adkins et al. |
| 6,871,926 B2 | 3/2005 | Adkins et al. |
| 6,873,424 B2 | 3/2005 | Jakobsson et al. |
| 6,917,440 B2 | 7/2005 | Kondo et al. |
| 6,940,613 B1 | 9/2005 | Beard et al. |
| 6,940,913 B2 | 9/2005 | Verbin et al. |
| 6,957,921 B1 | 10/2005 | Silverbrook et al. |
| 6,963,820 B2 | 11/2005 | Adkins et al. |
| 6,965,439 B1 | 11/2005 | Silverbrook et al. |
| 6,976,798 B2 | 12/2005 | Keane et al. |
| 7,050,726 B2 | 5/2006 | Adkins et al. |
| 7,134,594 B2 | 11/2006 | Thompson et al. |
| 7,146,114 B2 | 12/2006 | Frankel et al. |
| 7,163,273 B2 * | 1/2007 | Silverbrook | 347/19 |
| 7,216,951 B2 * | 5/2007 | Garrana et al. | 347/19 |
| 7,240,995 B2 | 7/2007 | Adkins et al. |
| 7,280,772 B2 | 10/2007 | Adkins et al. |
| 7,369,782 B2 | 5/2008 | Adkins et al. |
| 7,376,627 B2 | 5/2008 | Adkins et al. |
| 7,430,605 B2 | 9/2008 | Quach et al. |
| 7,469,107 B2 | 12/2008 | Adkins et al. |
| 7,585,043 B2 | 9/2009 | Adkins et al. |
| 7,589,850 B2 | 9/2009 | Adkins et al. |
| 7,689,513 B2 | 3/2010 | Adkins et al. |
| 7,739,198 B2 | 6/2010 | Adkins et al. |
| 7,788,490 B2 | 8/2010 | Adkins et al. |
| 7,792,992 B2 | 9/2010 | Gnanasambandam et al. |
| 7,798,594 B2 | 9/2010 | Adkins et al. |
| 7,859,412 B2 | 12/2010 | Kothari et al. |
| 8,174,714 B2 * | 5/2012 | Watanabe | 358/1.15 |
| 2002/0039193 A1 | 4/2002 | Kondo et al. |
| 2002/0049638 A1 | 4/2002 | Ito |
| 2002/0073002 A1 | 6/2002 | Horii et al. |
| 2002/0131079 A1 | 9/2002 | Forbes et al. |
| 2002/0135624 A1 | 9/2002 | Naka et al. |
| 2002/0194064 A1 * | 12/2002 | Parry et al. | 705/14 |
| 2003/0090705 A1 | 5/2003 | Ferlitsch |
| 2003/0098993 A1 | 5/2003 | Ohara |
| 2003/0115156 A1 | 6/2003 | Baker |
| 2003/0137549 A1 | 7/2003 | Adkins et al. |
| 2003/0151762 A1 | 8/2003 | Cherry et al. |
| 2004/0008371 A1 | 1/2004 | Keane et al. |
| 2004/0012644 A1 | 1/2004 | Allen et al. |
| 2004/0125397 A1 | 7/2004 | Adkins et al. |
| 2004/0153415 A1 | 8/2004 | Adkins et al. |
| 2004/0179885 A1 | 9/2004 | Adkins et al. |
| 2004/0190014 A1 | 9/2004 | Ferlitsch |
| 2004/0207668 A1 | 10/2004 | Adkins et al. |
| 2004/0215577 A1 | 10/2004 | Mitsuda |
| 2004/0236705 A1 | 11/2004 | Shima et al. |
| 2004/0249733 A1 | 12/2004 | Clough et al. |
| 2005/0091343 A1 | 4/2005 | Murray |
| 2005/0206672 A1 | 9/2005 | Adkins et al. |
| 2005/0273403 A1 | 12/2005 | Nguyen et al. |
| 2005/0286913 A1 | 12/2005 | Adkins et al. |
| 2006/0004672 A1 | 1/2006 | Leute |
| 2006/0020561 A1 | 1/2006 | Kodimer et al. |
| 2006/0044590 A1 | 3/2006 | Ferlitsch et al. |
| 2006/0056856 A1 | 3/2006 | Adkins et al. |
| 2006/0065715 A1 | 3/2006 | Kojima et al. |
| 2006/0069647 A1 | 3/2006 | Cozianu et al. |
| 2006/0095280 A1 | 5/2006 | Gooding |
| 2006/0120735 A1 | 6/2006 | Adkins et al. |
| 2006/0140647 A1 | 6/2006 | Adkins et al. |
| 2006/0190324 A1 | 8/2006 | Adkins et al. |
| 2006/0200735 A1 | 9/2006 | Ormond |
| 2006/0224889 A1 | 10/2006 | Adkins et al. |
| 2006/0233562 A1 | 10/2006 | Zwiefelhofer |
| 2006/0259983 A1 | 11/2006 | Sperry |
| 2006/0290973 A1 | 12/2006 | Inouye et al. |
| 2007/0027990 A1 | 2/2007 | Nakaoka et al. |
| 2007/0035762 A1 | 2/2007 | Wilsher et al. |
| 2007/0035763 A1 | 2/2007 | Bard et al. |
| 2007/6003576 | 2/2007 | Bard et al. |
| 2007/0057982 A1 | 3/2007 | Adkins et al. |
| 2007/0061268 A1 | 3/2007 | Herold et al. |
| 2007/0075137 A1 | 4/2007 | Adkins et al. |
| 2007/0077074 A1 | 4/2007 | Adkins et al. |
| 2007/0079125 A1 | 4/2007 | Adkins et al. |
| 2007/0088613 A1 | 4/2007 | Adkins et al. |
| 2007/0094148 A1 | 4/2007 | Adkins et al. |
| 2007/0156523 A1 | 7/2007 | Liu et al. |
| 2007/0174218 A1 | 7/2007 | Kojima et al. |
| 2007/0182984 A1 | 8/2007 | Ragnet et al. |
| 2007/0188530 A1 * | 8/2007 | Garrana et al. | 347/7 |
| 2008/0010211 A1 | 1/2008 | Ferraro |
| 2008/0027875 A1 | 1/2008 | Adkins et al. |
| 2008/0065477 A1 | 3/2008 | Korhonen et al. |
| 2008/0071626 A1 * | 3/2008 | Hill | 705/22 |
| 2008/0079989 A1 | 4/2008 | Agnetta et al. |
| 2008/0181622 A1 | 7/2008 | Adkins et al. |
| 2008/0183630 A1 | 7/2008 | Stephenson |
| 2008/0186187 A1 | 8/2008 | Adkins et al. |
| 2008/0186367 A1 | 8/2008 | Adkins et al. |
| 2008/0319845 A1 | 12/2008 | Adkins et al. |
| 2009/0006247 A1 | 1/2009 | Hansen et al. |
| 2009/0066985 A1 | 3/2009 | Ferlitsch |
| 2009/0070243 A1 | 3/2009 | Buck et al. |
| 2009/0070276 A1 | 3/2009 | Kodimer et al. |
| 2009/0147299 A1 | 6/2009 | Tetu |
| 2009/0192910 A9 | 7/2009 | Rankin et al. |
| 2009/0248578 A1 | 10/2009 | Pollock et al. |
| 2010/0039669 A1 | 2/2010 | Chang et al. |
| 2010/0088178 A1 | 4/2010 | Gnanasambandam et al. |
| 2010/0088201 A1 | 4/2010 | Nagarajan et al. |
| 2010/0097626 A1 | 4/2010 | Moore |
| 2010/0264214 A1 | 10/2010 | Gnanasambandam et al. |
| 2010/0268591 A1 | 10/2010 | Gnanasambandam et al. |
| 2011/0011929 A1 | 1/2011 | Padua et al. |

FOREIGN PATENT DOCUMENTS

| | | | |
|---|---|---|---|
| WO | 0102946 A1 | 10/2001 |

OTHER PUBLICATIONS

JD Biersdorfer, "Sharing files via an instant messaging program", Gainesville Sun. Gainesville, Fla.: May 24, 2004.*

Wagstaff, Jeremy, "Personal Computing: Experts Give Answers to Readers' Questions on Guarding Privacy Jeremy Wagstaff", Wall Street Journal. (Europe). Brussels: Jul. 17, 2003. p. A5.*

GB Search Report, May 24, 2011.

GB Office Action, GB1101124.4, Jun. 8, 2011.

U.S. Appl. No. 12/364,224, filed Aug. 5, 2010, Tredoux et al.

U.S. Appl. No. 12/424,820, filed Oct. 21, 2010, Gnanasambandam et al.

U.S. Appl. No. 12/424,858, filed Oct. 21, 2010, Gnanasambandam et al.

"Pay per Click", Wikipedia, the Free Encyclopedia, Oct. 3, 2008, Web, Jan. 11, 2011, http://en.wikipedia.org/wiki/Pay_per_click.

"Pay per Click", Wikipedia, the Free Encyclopedia, Apr. 7, 2009, web, Jan. 11, 2011, http://en.wikipedia_org/wiki/Pay_per_click.

"Pay per Click", Wikipedia, the Free Encyclopedia, Jan. 31, 2009, web, Jan. 11, 2011, http://en.wikipedia.org/wiki/Pay$_{per}$click.

* cited by examiner

METHODS AND SYSTEM FOR CONSUMABLE ORDER CREATION

BACKGROUND

The present disclosure is generally related to operation and management of document processing devices such as printers, scanners, copiers, combination scanner-printer-copier machines, and the like in accordance with customer accounts.

The disclosures of the following U.S. Patents and Patent Applications are hereby incorporated by reference in their entireties: U.S. patent application Ser. No. 12/364,224, entitled "METHOD AND SYSTEM FOR TRANSMITTING PROOF OF PAYMENT FOR "PAY-AS-YOU-GO" MULTI-FUNCTION DEVICES", and filed Feb. 2, 2009; U.S. patent application Ser. No. 12/424,820, entitled "METHOD AND SYSTEM FOR PROVIDING CONTRACT-FREE 'PAY-AS-YOU-GO' OPTIONS FOR UTILIZATION OF MULTI-FUNCTION DEVICES", and filed Apr. 16, 2009; U.S. patent application Ser. No. 12/424,858, entitled "SYSTEM AND METHOD FOR SELECTIVELY CONTROLLING THE USE OF FUNCTIONALITY IN ONE OR MORE MULTI-FUNCTION DEVICES AND SUBSIDIZING THEIR USE THROUGH ADVERTISEMENTS", and filed Apr. 16, 2009; U.S. Pat. No. 6,940,613, entitled "SYSTEM FOR MANAGING REPLACEABLE MODULES IN A DIGITAL PRINTING APPARATUS", and issued Sep. 6, 2005; U.S. Pat. No. 6,076,076, entitled "PREPAID PRINT CARD SYSTEM AND METHOD", and issued Jun. 13, 2000; U.S. Pat. No. 5,563,999, entitled "FORMS AUTOMATION SYSTEM", and issued Oct. 8, 1996; U.S. Patent Application Publication No. 2007/0094148, entitled "METHOD OF LICENSING FUNCTIONALITY AFTER INITIAL TRANSACTION", and published Apr. 26, 2007; U.S. Patent Application Publication No. 2004/0125397, entitled "LICENSING METHOD FOR USE WITH AN IMAGING DEVICE", and published Jul. 1, 2004; and U.S. Patent Application Publication No. 2004/0153415, entitled "METHOD OF LICENSING FUNCTIONALITY AFTER INITIAL TRANSACTION", and published Aug. 5, 2004.

Document processing devices are often employed in networked systems in business and academic sites providing users the option of sending a given print job to one of several devices for processing. Organizations employing multiple document processing devices desire options for financing and tracking printer utilization, and may prefer to pay for print services and related devices and materials based on usage rather than paying up front for equipment and consumable accessories. Moreover, manufacturers and resellers of document processing devices desire the ability to provide such account options to end-users. The conventional office equipment use model has been for the end customer to acquire document processing devices along with associated consumables, either on a paid-up or leased model. A leased model may include provisions that allow the customer to be billed on a periodic basis for use of the equipment and consumable supplies, with the charges including lease payments for the equipment as well as charges for use of consumables. In order to maintain printers and other document processing devices operational when needed, businesses, universities, and other organizations must monitor consumable product levels in the devices and ensure that replacement consumables are available when or before installed consumables are depleted, in order to avoid service outages and the expense of rush shipments of replacement products. Conversely, storing replacement consumables at a customer site is costly. Thus, there is a needed for techniques and systems to facilitate timely and cost-effective ordering and management of consumable products for document processing devices associated with a customer account. In addition, certain device purchase and/or lease programs advantageously offer customers warranty extensions or other incentives for use of so-called program consumables obtained through the supplier or reseller and/or for usage in excess of predetermined threshold amounts, and it is desirable to provide systems and methods by which compliance can be verified for such programs.

BRIEF DESCRIPTION

Systems and methods are presented for creating consumable orders for document processing devices and for verifying usage of consumables from approved sources in document processing devices. An agent program executing on a customer computer receives electronic reports from devices registered to a customer account and determines whether particular devices will need replacement consumables and also whether non-program consumable products are being used in particular devices based in whole or in part on the received reports. If a replacement will be required, the agent on the customer computer presents a prospective order to the customer using prompting content customized to a particular reseller with which the customer is familiar. The customer may accept, modify, or reject the proposed order, and the customer computer agent automatically forwards accepted orders to an account manager system for automatic placement, after which the necessary consumable product is shipped to the customer. Moreover, if the customer computer agent determines if the device has a non-program consumable installed, the account manager system is notified and may warn the customer that continued usage may void one or more warranty extensions or other program incentives.

In accordance with one or more aspects of the present disclosure, a system is provided for generating consumable orders for document processing devices. The system includes a processing element, such as a customer computer coupled with a network, which communicates with one or more document processing devices registered to a managed customer account. The processing element operates a consumable monitoring component which receives electronic reports from one or more devices via the network, and determines whether a particular document processing device needs or will soon need a replacement consumable based at least in part on the electronic reports. The system further includes an order generation component operable by the processing element to selectively prompt the user to place a proposed order for a replacement consumable if a particular device needs or soon will need a replacement consumable. If the user agrees, the order generation component provides order information to an account manager system for placing an order for a replacement consumable via the network. In certain embodiments, the order generation component renders order prompting content associated with a particular reseller (e.g., one or more reseller identifiers rendered to the user) when prompting the user to place a proposed replacement consumable order, which presentation content may be modified or provided by the reseller with which the customer regularly interacts, and the user may selectively modify the proposed order before accepting.

In this manner, the system timely informs the customer of the need for upcoming consumable orders and the necessary ordering details are presented for easy acceptance, without involving sales personnel and avoiding extra cost associated with expedited shipment, while maintaining the customer interface with the reseller, and without requiring the user to stock replacement consumable products or regularly monitor consumable supply levels in devices associated with an account. In certain embodiments, moreover, the consumable monitoring component determines whether the device is using a non-program consumable based at least in part on the electronic reports, and if so, notifies the account manager system via the network that the particular document processing device is using a consumable from a source not associated with the customer account. The consumable monitoring component in certain embodiment also receives print consumption information from the electronic reports and updates the account manager system with device print consumption information for assessing compliance by the customer with minimum usage amounts related to incentive program eligibility.

Further aspects of the disclosure involve methods for creating consumable product orders for document processing devices, including communicating with one or more document processing devices via a network, where the devices are registered to a customer account managed by an account manager system. The methods further include receiving electronic reports from devices via a network and from the reports whether a particular document processing device needs or will soon need a replacement consumable. The methods also include selectively prompting a user to place a proposed order for a replacement consumable using a customer computer, and responsive to an affirmative user choice providing order information to the account manager system via the network using the customer computer. Certain embodiments of the methods include rendering order prompting content identifying a particular reseller when prompting the user for a proposed order, allowing the user to modify the proposed order, and/or allowing the particular reseller to provide or modify the order prompting content.

In certain embodiments of the method also include determining whether the particular document processing device is using a consumable from a source not associated with the customer account based in whole or in part on the electronic reports, and if so, selectively notifying the account manager system via the network using a customer computer that the particular document processing device is using a non-program consumable. Certain implementations, moreover, may also include warning the user via a customer computer that continued usage of the non-program consumable may void eligibility for at least one program incentive.

In other aspects of the disclosure, a system is provided for verifying usage of consumables from approved sources in devices registered to a customer account. The system includes a customer computer or other processing element operatively coupled with a network to communicate with at least one document processing device. A consumable monitoring component is provided which is operable by the processing element to receive electronic reports from at least one document processing device via the network. The consumable monitoring component determines whether a particular document processing device is using a consumable from a non-approved source based at least in part on the reports, and if so, notifies the account manager system that the device is using a consumable from a source not associated with the customer account. In certain embodiments, the monitoring component warns the user that continued usage of the consumable from a source not associated with the customer account may void eligibility for one or more program incentives. The monitoring component in certain embodiment receives print consumption information from the reports and updates the account manager system with device print consumption information.

In accordance with further aspects of the disclosure, a method is provided for verifying approved source consumable usage in document processing devices. The method includes communicating with, and receiving electronic reports from, one or more document processing devices via a network, and determining whether a particular device is using a consumable from a source not associated with the customer account based is whole or in part on the electronic reports from the device, and if so, using a customer computer to selectively notify the account manager system via the network of the usage in the particular device of a non-program consumable. Certain embodiments of the method also include warning the user via the customer computer that continued usage of the consumable from a source not associated with the customer account may void eligibility for at least one program incentive. In certain embodiments, the method also includes receiving print consumption information from the electronic reports and updating the account manager system with device print consumption information.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
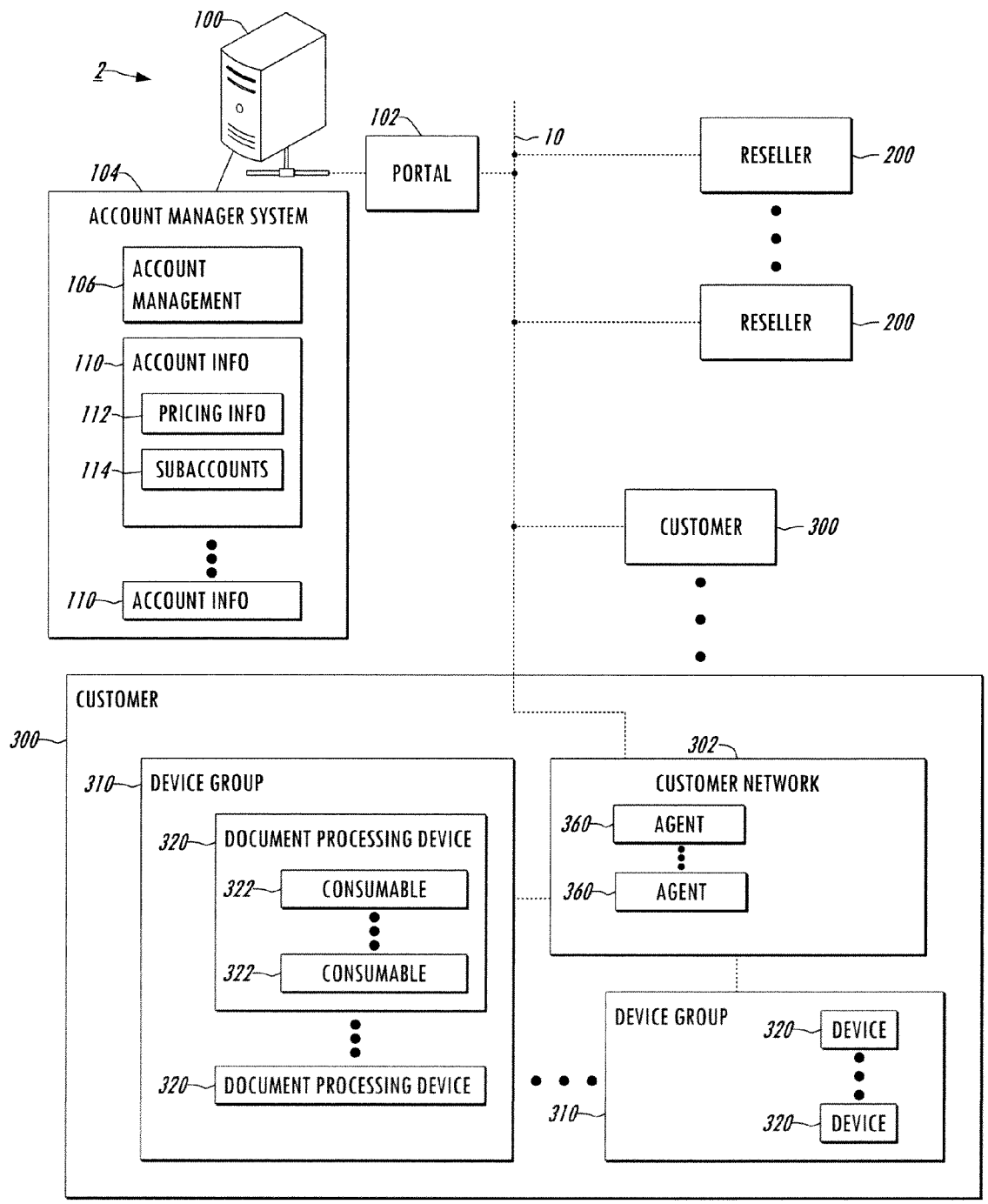
FIG. 1 is a system diagram illustrating an exemplary commercial environment with an account manager and various resellers and customer sites networked in which one or more aspects of the present disclosure may be implemented.

Referring now to the drawings, FIG. 1 shows a networked commercial environment 2 with one or more networks 10 interconnecting a server 100 with one or more resellers 200 and customers 300, where access to an account manager system 104 implemented in the server 100 is accomplished via a portal 102. The server 100 can include a single computer processor or multiple processing elements, and the server 100 may be implemented as a single integrated processor-based structure including memory or may be implemented in distributed fashion including multiple structures, some of which are processor-equipped. The account manager system 104 can be any suitable combination of processor-based hardware, logic, processor-executed software, firmware, or combinations thereof, and may be implemented in a unitary platform (e.g., server 100) or in distributed fashion across multiple processor-equipped devices. In the embodiments, the reseller(s) 200 and customer(s) 300 include reseller and customer networks, respectively, with computers at the reseller(s) 300 and customer(s) 300 being equipped with agent software programs (e.g., customer agents 360 in FIG. 1) operative to allow authorized, secure, encrypted communication between authorized reseller/customer personnel and the account manager system 104 through access via the portal 102. Moreover, the customer agents 360 provide for operation and management tasks between customer document processing devices 320 registered to a customer account and the account management system 104 via the portal 102, and also allow customer to use the agent 360 to communicate with one or more processing devices 320 coupled to a customer network 302. The customer network 302 may include any form of electronic communication network(s) by which the devices 320 can communicate directly or indirectly with the customer computers 330 and/or with the account manager system 104, including without limitation dedicated networks, internet connections, and may include connection of one or more devices 320 with the account manager system 104 via telephony networks (wired and/or wireless or combinations thereof). Thus, the network connection of the devices 320 includes situations in which a primary network connection is inoperative ("network down" condition) with recovery or alternative communications means (e.g., telephone line connection to the devices 320) being provided as an alternative for communication between the devices 320 and the account manager system 104 for validation or other steps.

Figure 2:
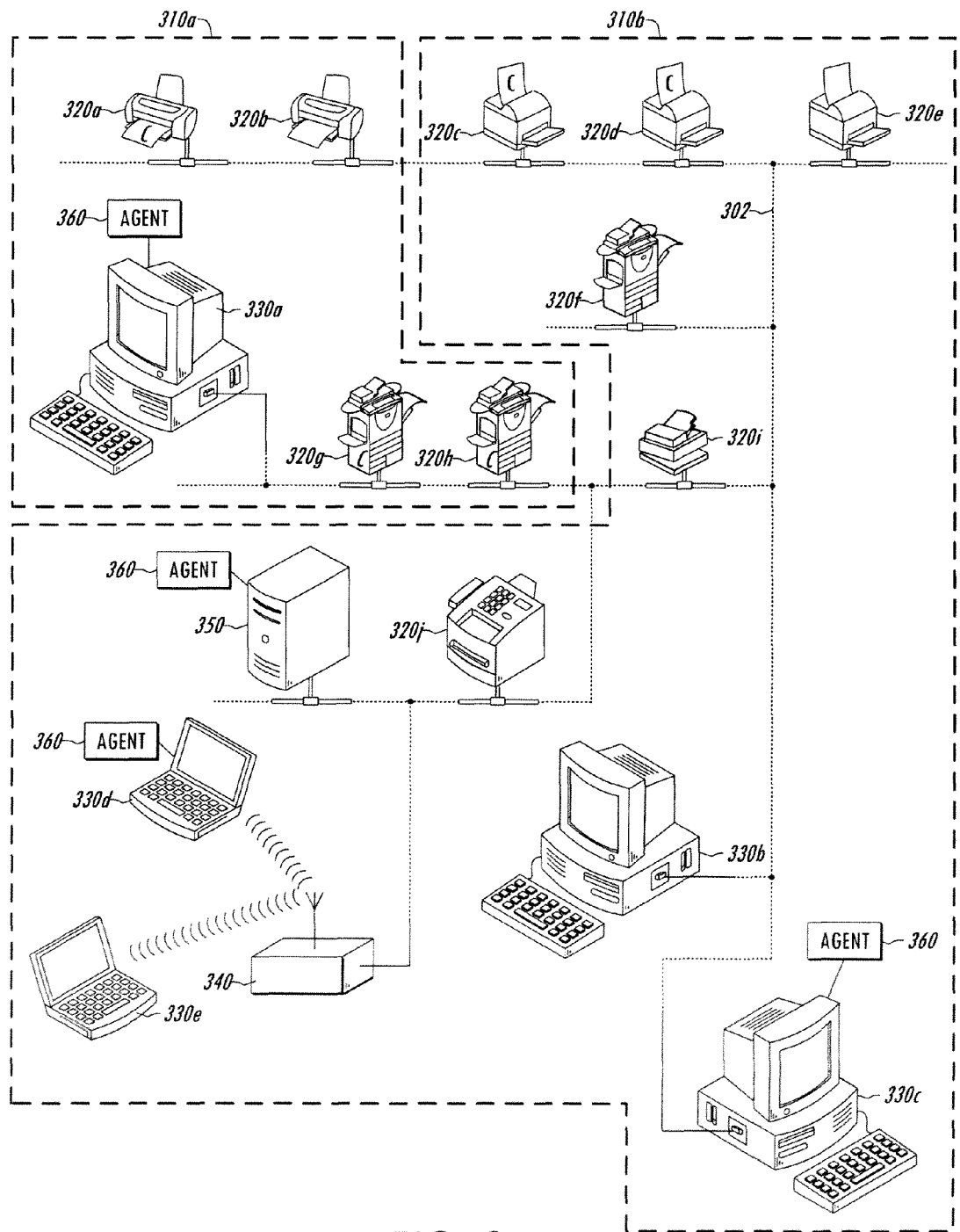
FIG. 2 is a system diagram illustrating further details of an exemplary customer networked computing environment with a plurality of user computers with printer device management agents, and with a plurality of printer, scanner, copier, and multi-function type document processing devices that may be managed according to various techniques of the present disclosure.

Referring also to FIG. 2, an exemplary distributed customer computing environment is illustrated, including two exemplary logical device groups 310a and 310b, each including one or more computing devices 330, some of which are equipped with agent components 360. In the illustrated environment, the computers 330 are selectively authorized to print or initiate other document processing operations via the devices 320 or predefined subsets of the devices 320, for example, by appropriate password entry & verification via the customer's network 302 and associated network elements and/or by access/usage control features implemented in the devices 320 themselves. The individual groups 310 also include one or more document processing devices 320. The illustrated customer computers 330 and device 320 are operatively coupled via a customer network 302 which may be any suitable form of communications network or interoperative networks. In addition, one or more print servers 50 are coupled with the network 302, where certain portions of the network 302 may be interconnected by cabling or one or more portions may be wireless, and where one or more exemplary computers 330d and 330e are illustrated in FIG. 2 with operative communicative coupling to the network 302 being implemented using a wireless network transceiver interface component 340. Any number of user computers may be operatively coupled to the network 302, including without limitation desktop computers 330a and 330b, laptop computers 330d and 330e, and any number of document processing devices 320 may be coupled with the network 302. Different forms of document processing devices 320 are networked together in this example to provide the user computers 330 with a broad range of document processing options available for a given print job or other task. One or more of the devices 320, moreover, are registered to one or more customer accounts and are operable via the network 302 or by users actuating on-board controls (e.g., buttons, keypads, etc.) for copying and scanning operations and other tasks. The document processing devices 320 may include one or more managed consumables 322 (FIG. 1 and FIG. 4 below) such as non-print media items or materials consumed by the device during document processing operations, including without limitation toner, ink, a replaceable fuser module/component, replaceable imaging units, waste toner bins, transfer belt, or the like.

The exemplary document processing devices 320 shown in FIG. 2 include relatively low throughput externally fed color as well as black and white desktop printers 320a and 320b, respectively, intermediate speed drawer fed color and black and white printers 320c-320e, high volume color as well as black and white printer/scanner/copier (i.e., multi-function) devices 320f-320h, a desktop combination printer/scanner/copier 320i and a combination printer and facsimile machine 320j. Document processing devices 320 may include any device operable to perform one or more document processing functions, including without limitation printers, scanners, copiers, combination scanner-printer-copier machines, and the like. In FIGS. 1 and 2, the customer network 302 and the external network 10 can be arranged in any suitable configuration for example star, ring, bus, tree, mesh, etc. or combinations thereof, and may be a wired network, a wireless network, or combinations thereof, wherein the illustrated customer network 302 of FIG. 2 provides one or more wireless nodes 340 for connectivity for portable laptop computers 330d and 330e through various WiFi or other wireless means.

The devices 320, moreover, are configured to allow normal customer/user initiated operation based on available print units applied to the device 320 in accordance with a customer account administered via the account manager system 104, and may optionally be authorized by the account particulars to perform at some low level of functionality even when the applied print units are depleted as discussed further below. By this device functionality, all or at least certain aspects of the actual or expected cost of document processing operation of a given device can be attributed to the customer based on usage, including the initial device cost, cost of consumables 322, costs for servicing (e.g., repairing, troubleshooting, etc.), costs for access to customer support, and other associated costs, rather than being paid up front by the customer.

Figure 3:
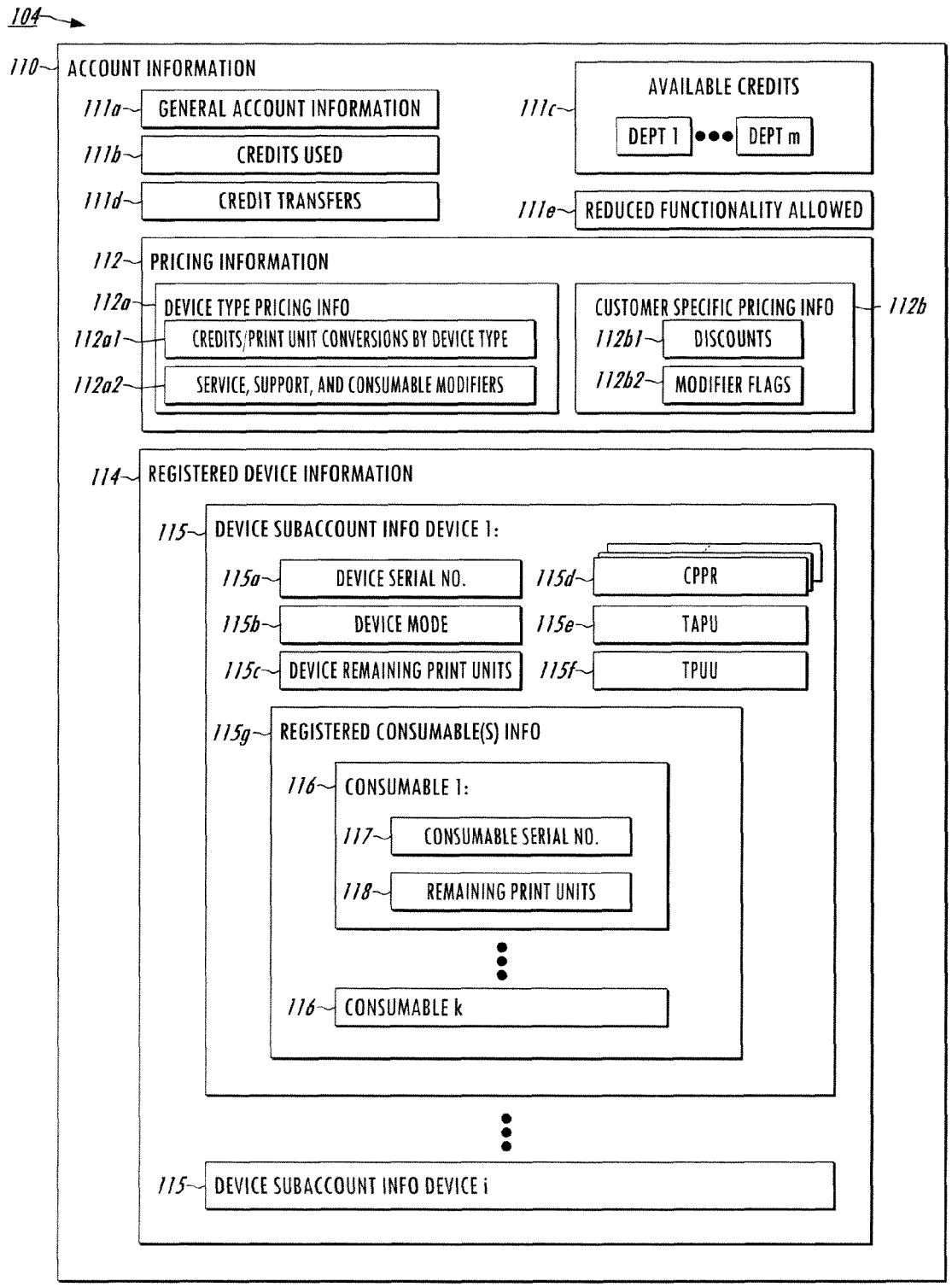
FIG. 3 is a schematic diagram illustrating exemplary account information stored in the account manager system of FIG. 1.

Referring now to FIGS. 1 and 3, usage of the devices 320 is managed via these prepaid accounts by the system 104 using various account information 110 stored in a data store operatively coupled with the server 100, where the data store can be external or internal to the server 100 or combinations of internal and external storage. The account information 110 is stored for a plurality of accounts, for example, a first account for management of prepaid devices 320 of the first device group 310a in FIG. 2 and a second account for devices 320 of the second group 310b, and account information is also stored for multiple different customers, including those customers or 'vendors' that register so-called 'public' devices 320 as discussed further below in connection with FIG. 11.

As best shown in FIG. 3, the account information 110 for individual accounts includes general account information 111a (e.g., account owner name, address, billing information, authorized users, etc.), a credits used value 111b, for instance, indicating the number of credits that have been previously applied to devices 320 to date from account inception, or in a given predefined period (e.g., year-to-date, etc.), and an available credits value 111c indicating an amount of account credit units currently available to the account for which the corresponding customer has previously paid and which can be applied to one or more devices 320 by customer-initiated request. The available credits information 111c in certain embodiments includes two or more values indicating credits available for different departments or organizational entities within a given customer enterprise. The account information 110 in this embodiment also includes credit transfer information 111d and reduced functionality permission information 111e (described further below in connection with FIG. 3).

The account information 110 for a given account also includes current pricing information 112 including at least one conversion factor for converting account credits available to the account to print units for specific document processing devices 320 registered to the account. The current pricing information 112 for individual accounts in this embodiment includes device type pricing information 112a including at least one price factor 112a1 for each specific document processing device type for converting account credits to print units, and at least one print unit price modifier 112a2 for each of a plurality of different specific document processing device types for increasing the print unit price if a given customer account provides for including one or more additional cost factors for consumables, service, and support in the print unit price. The pricing information 112 also provides customer specific pricing information 112b including discount information 112b1 and modifier flags 112b2 indicating applicability of one or more of the print unit price modifiers 112a2 for the given customer account.

In some embodiments, different discount information 112b1 can be provisioned in the account information 110 for specified document processing devices 320 obtained by a given customer from different resellers 200 and/or for specified document processing devices 320 obtained in different locations or regions, thereby providing reseller flexibility in offering discount incentives to select customers on a global or locality basis. Program provisions can be associated with specific account numbers prior to a reseller offering the accounts for sale to end-customers 300, for example, where the account particulars include account pricing (conversion rates for converting credits into print units), print unit valuation equivalent to typical print images based on coverage, color content, etc., inclusions of service, supplies and media, various incentives, etc. The pre-established account particulars can be associated with a device 320 upon account initiation prior to delivery to the customer 300. In addition, promotional incentives like time frame duration and/or number of printed images can be managed in concert with product usage information associated with and tracked by a customer account, for instance, by tracking use debits and credit balance payments and various particulars of image content.

Account credits are a global currency, which may, but need not, be tied to one or more official government monetary currency value (e.g., N credits per U.S. dollar, etc.) thereby allowing customers to purchase credits for their account(s) using any form of legal payment (e.g., payment obtained and verified electronically via financial institutions, credit organizations, etc.) or direct monetary payments, whether in Dollars, Euros, Yen, etc., with the account manager system 104 being operative to obtain current exchange rate information and make any necessary conversions from a given legal currency payment amount to an account credit amount. Print units, on the other hand, are valued for a given device type and possibly other factors, in terms of units per account credit on a transactional basis at the time of a user request to apply account credits to a particular document processing device, with the valuation being in terms of document processing operations, for instance, one print unit per monochrome page printed by a device 320, 5 print units per printed color page, where a processed 'page' as used herein is a single side of a printed media sheet (or a single page of a multi-page document or print job being scanned or operated on by a device 320), such that a device 320 consumes one print unit for printing monochrome images, text, etc., on a single side of an output sheet, consumes 5 print units for printing color images, text, etc. on a single side of a printable medium, and consumes 2 print units to print monochrome images, text, etc. on both sides of a printable media sheet in one example. The application of credits to devices 320, moreover, may be done with respect to integer and/or fractional credits and print units. For example, the customer may specify a given amount of account credits (in whole credits or fractions thereof) to be 'applied' to a device 320, and the account manager system may present the customer with the number of converted print units for that device 320, and the device may be adapted to accept fractional print unit amounts or the account management system may perform rounding to provide only integer print unit amounts, with any fractional values being retained as fractional credits in the customer account.

As illustrated in FIG. 3, the account information 110 also includes registered device information 114 with device subaccount information 115 for a plurality of device subaccounts individually associated with a particular document processing device 320 registered by the customer to the account. The device subaccount information 115 for individual device subaccounts includes a device serial number 115*a* to identify devices 320 registered to the account, a device mode indicator 115*b* (e.g., including a value indicating toner out, a value indicating whether or not the corresponding device 320 is managed by the system 104, etc.), a remaining print unit value 115*c* indicating the amount of print units previously applied by the customer to the particular document processing device 320 and currently available to enable the particular document processing device 320 to perform document processing operations, at least one current page price ratio (CPPR) value 115*d* indicating the number of applied available print units the particular document processing device 320 will consume to print a color page, a total applied print units value (TAPU) 115*e*, and a total print unit used (TPUU) value 115*f* indicating the total number of print units used by the corresponding document processing device 320. In addition, the device subaccount information 115 includes registered consumable(s) information 115*g* including consumable information 116 for one or more consumable individual components 322 operatively associated with the particular document processing device 320 with a consumable serial number or other identifier 117, and a remaining print units value 118 in one example.

Figure 4:
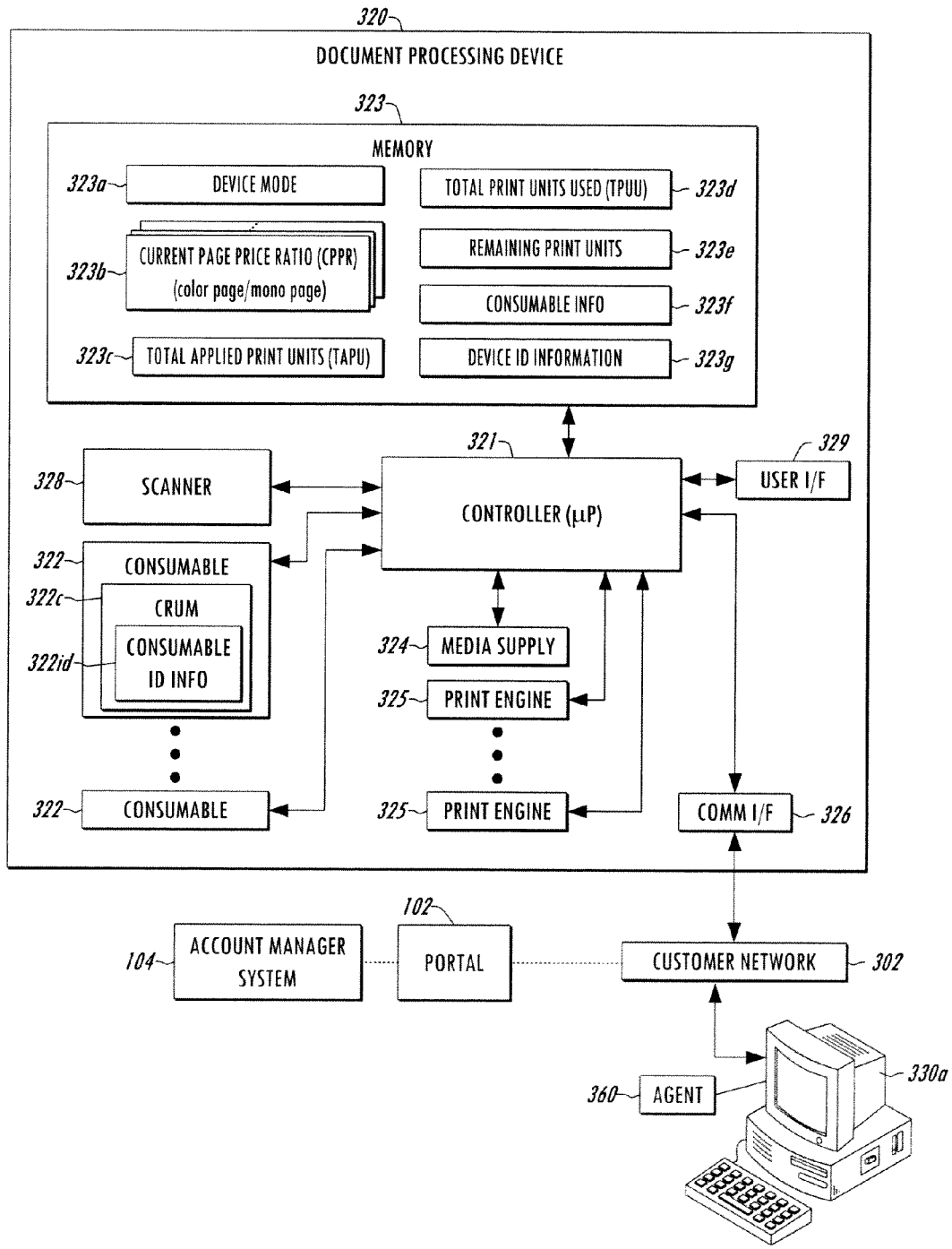
FIG. 4 is a schematic diagram illustrating further details of an exemplary document processing device registered to an account managed by the account manager system of FIG. 1.

In operation, a customer can request an estimate of remaining pages for a specific device 320 registered to the customer's account via an agent 360 and the portal 102, and the account manager system 104 in one embodiment will provide the remaining print units count value 118 in response. In certain implementations, the customer can use the agent to directly obtain this count value from the device itself via the agent 360 and the customer network 302 (e.g., the device 320 will report the current remaining print units value 323*e* from its internal data in memory 323 as shown in FIG. 4). In certain embodiments, the account manager system 104 may provide the customer with an estimate of the number of remaining mono and color pages printable, for example, by analyzing historical print data (color vs. mono printing) for the particular device 320 and use this in conjunction with the CPPR value 115*d* to estimate the number of mono and color pages for the customer. The account information 110 can thus accommodate multiple accounts for multiple customers 300, each associated with multiple document processing devices 320 of an unlimited number of different device types, where the devices can have one or more identified consumables 322 for management by the account manager system.

Figure 7:
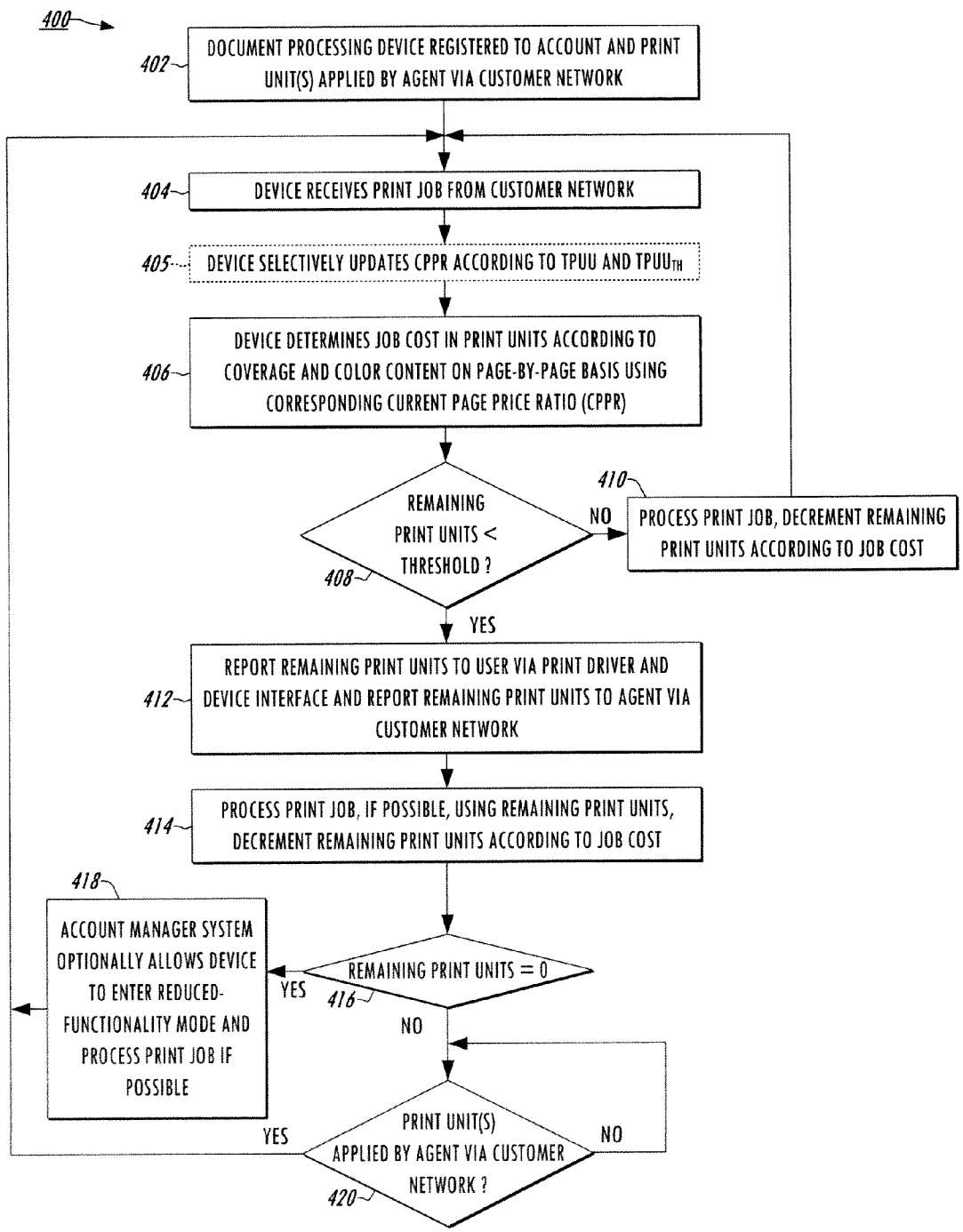
FIG. 7 is a flow diagram illustrating exemplary operation of a customer document processing device.

Referring also to FIGS. 4 and 7, an exemplary document processing device 320 is shown in FIG. 4 with a processor-equipped controller 321 and a memory 323, where the device 320 is programmed or provided with suitable processor-executed software, firmware, logic, etc. to controllably provide document processing functions such as printing, faxing, scanning, or combinations thereof and to implement the print unit consumption features of a device registered to an account managed by the account manager system 104. In the illustrated example, a communications interface 326 provides for interfacing the device 320 with the customer network for communicative exchange of data, information, print jobs, etc. with other networked devices, computers, etc., including user computers 330 and agents 360 thereof, and with the account manager system 104 via the portal 102. The device 320 in certain embodiments includes a user interface 329 operative to receive inputs from and provide outputs to, a user associated with the customer 300. In addition, the device 320 includes one or more document processing components or systems, such as one or more print engines 325, a scanner 328, media supply 324, and consumable(s) 322, and other such devices (e.g., scanners, sheet feeders, etc., not shown). The memory 323 in this example stores program code and processor-executable instructions for implementing the device functionality, as well as local data to support this operation, including the current device mode information 323*a* (e.g., corresponding to the mode information 115*b* in the account information 110 in FIG. 3), one or more current page price ratio value(s) (CPPR) 323*b* (corresponding to the CPPR value(s) 115*d*), a TAPU value 323*d* (corresponding to TAPU value 115*e*), a TPUU value 323*d* (corresponding to TPUU 115*f*), consumable information 323*f* obtained from processing elements of the consumable(s) 322 via the controller 321 (corresponding to consumable information 116 in FIG. 3), and a device identification (ID) information 323*g*, such as a device serial number, type, etc., where the customer agent 360 operates when possible to obtain information from the device 320 (while device 320 is connected to the network 302), and updates the account information of the account manager system 104 accordingly.

FIG. 7 illustrates exemplary operation of the document processing device 320 in a process 400, in which the device 320 is initialized or registered at 402 to one or more customer accounts by the customer 300 or by a reseller 200, and one or more print units are applied to the device 320 by the customer via a customer agent 360. The example of FIG. 7 is illustrated and described in the context of a printing operation, but similar operation is provided for any other form or type of customer/user-requested document processing operation by a device 320. At 404, the device 320 receives a print job from the customer network 302 (alternatively print job may be part of a copy operation initiated at the device 320 itself, or a print job could be provided by a computer 330 connected to the device 320 even if the device 320 is currently not connected to the network 302). At 405, in one embodiment, the device 320 optionally selects an appropriate current page price ratio (CPPR) from a stack 119 (FIG. 6 below) of page price ratio (PPR) values 119*a* according to the current value of the total print units used (TPUU) 323*d* and according to a threshold value $TPUU_{TH}$ 119*b* in the stack 119. At 406, the device 320 in one embodiment determines the cost for performing the job in terms of print units according to the coverage and color content on a page-by-page basis using CPPR value(s) 323*b* (FIG. 4), and a determination is made at 408 as to whether the remaining print units (value 323*e* in FIG. 4) is less than a threshold. In other implementations, the device 320 may determine the job cost based on color content for the entire job (i.e., page cost determined to be 'color' for each page if at least one page of the job uses color).

Figure 5:
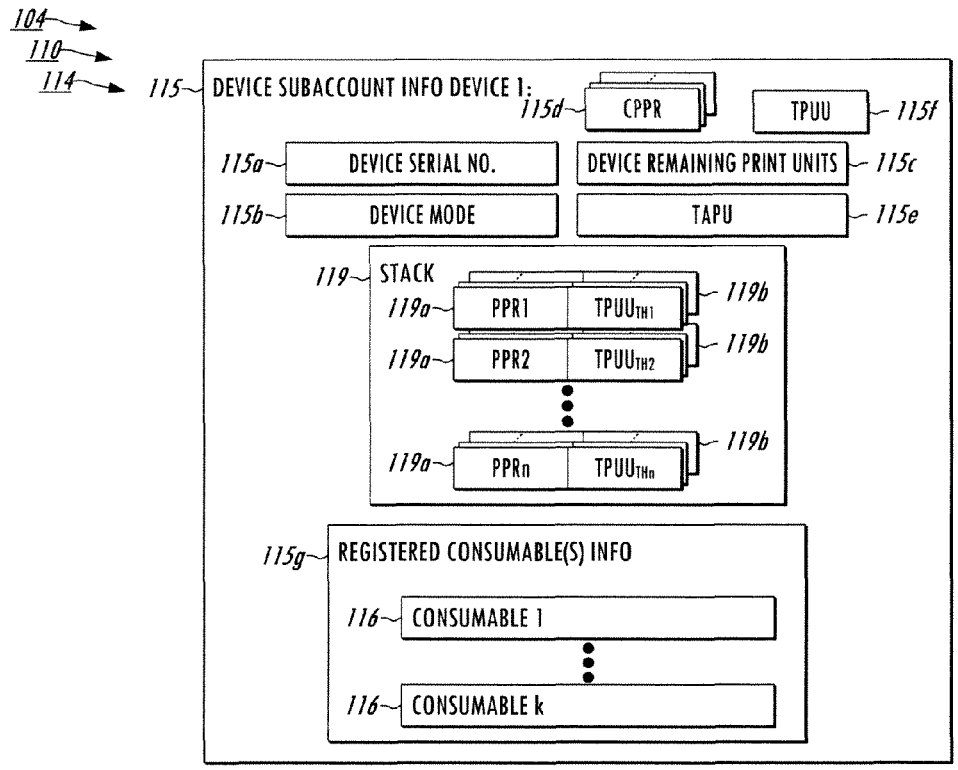
FIG. 5 is a schematic diagram illustrating another embodiment of the account information stored in the account manager system of FIG. 1.
Figure 6:
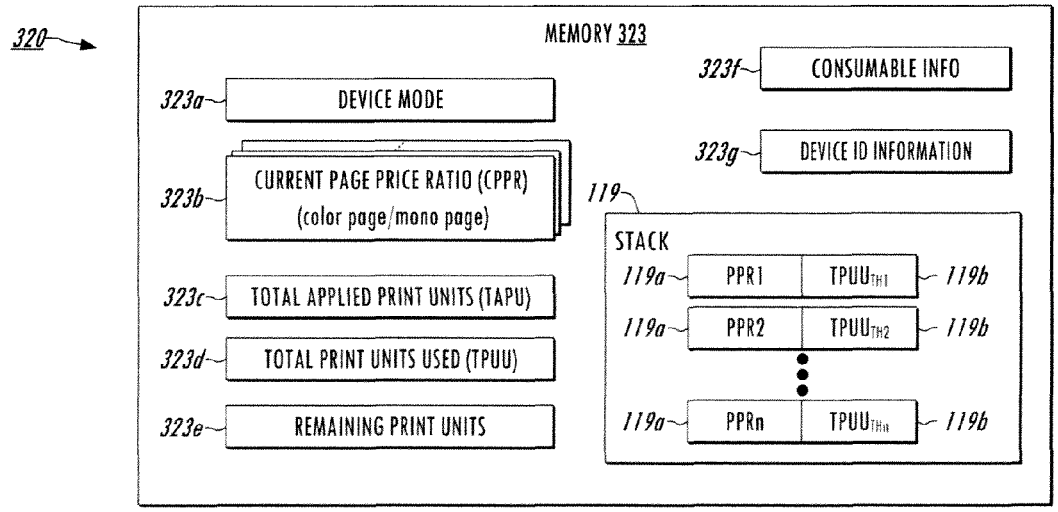
FIG. 6 is a schematic diagram illustrating another embodiment of the document processing device.

As shown in FIG. 3, the device subaccount information 115 for individual device subaccounts in certain embodiments may include a plurality of different current page price ratios 115*d* indicating the ratio of the number of applied available print units particular document processing device 320 will consume to print a color page vs. that of a monochrome page, which correspond to different page coverage levels for color pages of documents to be processed. Moreover, the device 320 likewise maintains a corresponding plurality of CPPR values 323b as shown in FIG. 4. In this manner, the account manager system 104 authorizes a specific document processing device 320 to determine page coverage levels for a given color page of a given print job and to consume a corresponding number of available print units to print the given color page according to the corresponding current page price ratio 115d chosen based on the coverage. The CPPR selection for coverage differences can be done in some embodiments on a page-by-page basis. In other embodiments, the device 320 may be configured to determine an average coverage level for all or a subset of the pages of a given jobs and select the corresponding CPPR 115d for the entire job. Moreover, the account manager system 104 may provide the devices 320 with multiple pairs of page price ratio (PPR) values 119a and corresponding threshold values (TPUU$_{TH}$) 119b with each pair corresponding to a different page coverage value, as shown in FIGS. 5 and 6. In certain embodiments, CPPR may be applied based on printing over a time period, such as days or weeks, or be based on attainment of cumulative totals for a number of pages or jobs.

Returning to FIG. 7, if the required number of print units is available (NO at 408), the print job is processed by the device 320 at 410, and the process 400 returns to await the next document processing task/job at 404. If, however, the remaining number of print units is below the threshold (YES at 412), the device 320 reports the remaining print units (value 323e in FIG. 4) to the user (e.g., via an on-board display and/or via a print driver employed in submission of the print job), and reports the remaining print unit value 323e to an agent 360 via the customer network 302 if currently connected thereto. At 414, the print job is processed by the device 320 (if possible using remaining print units), and the value 323e is decremented according to the cost of the processed job. Otherwise, a determination is then made at 416 as to whether any print units are left in the device 320 (e.g., whether the value 232e has reached zero). If the device is depleted (YES at 416), the device 320 notifies the agent 360, which then notifies the account manager system 104 of the empty status of the device 320, and the account manager system 104 may optionally allow the device 320 to perform at a predetermined reduced level of functionality at 418 (e.g., only print monochrome, only print small jobs, only perform faxing and scanning, etc.) according to the reduced functionality information 111e (FIG. 3). At any point, moreover, authorized customer personnel may apply additional print units to the device at 420 via an agent component 360 and the account manager system 104, after which the unit returns to normal operation. In this manner, the operations of the devices 320 are controlled by the selective application of print units, without which the device 320 will not print (other than the optional account provisions for reduced functionality operation with account-specified restrictions).

Figure 8:
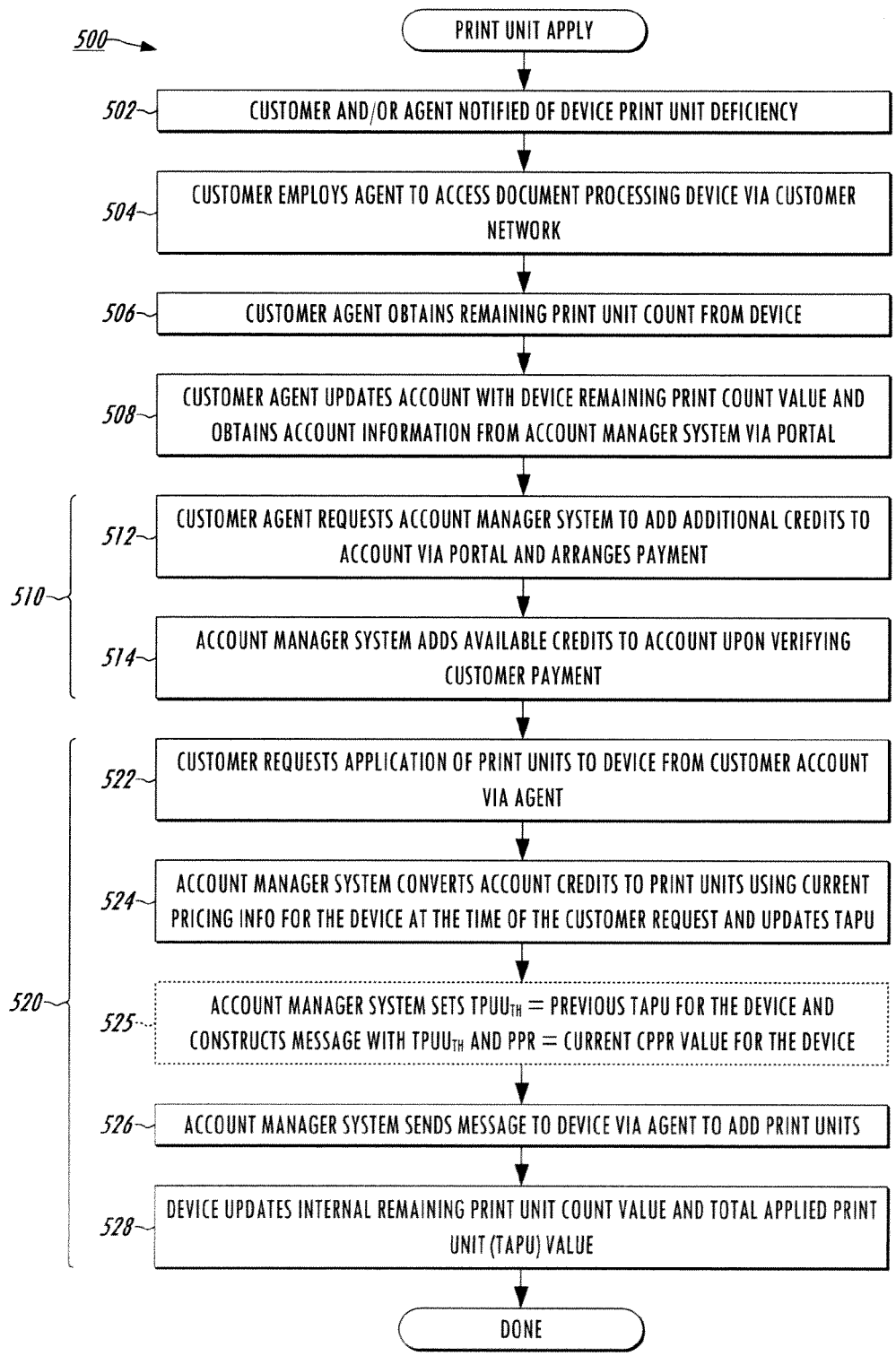
FIG. 8 is a flow diagram illustrating an exemplary process for buying and applying credits to one or more document processing devices.

FIG. 8 illustrates an exemplary process 500 by which the account management component 106 of the manager system 104 (FIG. 1) adds credits to an account at 510 and applies print units to a device 320 at 520 upon corresponding request(s) from a customer of a specified account via an authorized agent 360 and the portal 102. In the illustrated process 500, the customer and/or agent 360 are notified at 502 that a particular device 320 has no remaining print units (or that the print unit level is below a threshold value, as discussed in FIG. 7 above). At 504, the customer employs the agent 360 to access the device 320 through the customer network 302, and obtains the remaining print unit count (e.g., value 323e in FIG. 4) from the device 320. At 508, the customer agent 360 accesses the account manager system 104 via the network 10 and the portal 102, updates the corresponding customer account with the remaining print count value (e.g., value 115c in FIG. 3 above), and obtains the corresponding account information 110 for informing the customer of the current account status, such as currently available credits that can be applied to the empty device, current pricing information, etc.

At 510, the account manager system 104, upon customer credit purchase or 'buy' request via the agent 360 and portal 102, selectively adds credits to the specified account at a current rate and add a number corresponding to a paid amount of new credits to the available credits value 111 c for the specified account if and when the payment for such by the customer is verified. In this example, the agent 360 requests the addition at 512 via the portal 102, and arranges payment, such as via an electronic third party payment mechanism, not shown. At 514, when the account manager system 104 is able to verify the customer payment, it adds available credits to the corresponding customer account, and thus increments the value 111c in the account information 110.

At 520, the account management component 106, upon a request from the customer via the authorized agent 360 and the portal 102, applies print units to a specified document processing device 320 associated with the specified account by converting a number of credits currently available to the specified account into a number of print units according to the specified document processing device 320 and the current pricing information 112 for the specified account at the time of the request. In this example, the customer requests application of print units at 522 to the device using available account credits. At 524, the account manager system 104 converts account credits to print units using the current pricing information 112, and updates the total applied print units (TAPU) value 115e in the corresponding device subaccount information 115. In one embodiment, account manager system 104 updates a stack 119 (FIG. 5 below) at 525 with a new pair of page price ratio (PPR) and threshold values TPUU$_{TH}$ 119a and 119b, respectively, by setting the new TPUU$_{TH}$ to the pervious TAPU value (i.e., the total applied print units (TAPU) value before the current application of further print units). The account manager system 104 sends a message at 526 to the device to add the applied print units (via the agent 360). The device 320 then updates its internal remaining print unit count value 323e and its total applied print units (TAPU) values at 528. In this regard, it is noted that the valuation of the print unit cost is done at the time of application of print units to devices 320, and not when credits are initially bought by the account holder, whereby the system 104 is operative to track sales transactions at the appropriate time when the customer actually purchases the value of the prospective document processing services, which may include consumable, service, support, and other cost factors.

It is further noted that the interaction of the account management component 106 of the system 104, the agent components 360 on the customer computers 330, and the devices 320 can be implemented using multiple messages for requests, confirmations, authorizations, data exchanges, value updates, and other tasks, and the messages can be created and transmitted via any suitable network protocols, etc., and where the messaging is preferably controlled by appropriate authorization, password permission control, encryption, and other techniques to prevent uncontrolled print unit creation without authorization by the account manager system 104, and to guard against unauthorized access to the account information 110. In an alternative implementation, the concept of print unit deficiency notice may be supplemented or supplanted by an arrangement to use a low or out print unit threshold to trigger an automatic purchase of additional print units.

Referring also to FIGS. 5 and 6, the account manager system 104 and the devices 320 in certain embodiments implement an adaptive form of page price ratio adjustment to accommodate changes in the relative cost of printing color versus monochrome pages for a given device 320. For example, a ratio of three (3) may apply for a given document processing device 320 (e.g., according to the device type, the customer account parameters negotiated with the reseller 200, customer region, etc.) at an initial period of time, and this ratio may thereafter change to two (2). The change in the page price ratio may be a negotiated customer-specific arrangement, such as a discount for color printing in a given year or other time period after a certain threshold number of print units are used by that device (e.g., TPUU value 323d in the device memory 323, value 115f in the corresponding device subaccount information 115). In another example, the ratio may change to reflect changes in consumable costs, such as a decrease in color toner cost, with savings passed on to the customer. In order to accommodate such potential changes while minimizing large potential swings in the costs experienced by the customer, the account manager system 104 correlates the ratio with applied print units at the time these are applied to a given device 320, and the device 320 will use the ratio correlated with specific print units as these are expended in performing document processing operations. Thus, for a given device having a large number of print units remaining unused when a page price ratio change occurs, the new ratio will not be applied to the previously applied print units.

To implement this approach, the account manager system 104 and the devices 320 maintain corresponding information stacks 119, where the device subaccount information 115 for a given device 320 in the account manager system 104 includes a stack 119 as shown in FIG. 5, and the device memory 323 also stores a corresponding stack 119 as shown in FIG. 6. As described above and shown at 525 in FIG. 8, each time new print units are applied to a given device 320, the account manager system 104 constructs and sends a message to the device 320 (via the portal 102 and corresponding customer agent 360), including a new stack entry having a page price ratio (PPR) 119a that is set to the present value of the CPPR 115d at the time the print units are applied. The account manager system 104 also sets a threshold $TPUU_{TH}$ 119b in the stack to the previous total applied print units (TAPU) value 115e of the device subaccount information 115. The system 104 then increases the TAPU value 115e to reflect the application of new print units for that device 320 and sends one or more messages to the device 320 to provide the stack entry pair PPR 119a and $TPUU_{TH}$ 119b to the device 320 and to authorize the increase in the device's remaining pint units value 323e for the application operation. The device 320, in turn, updates its stack 119 with the new entry pair PPR 119a and $TPUU_{TH}$ 119b and increases its remaining print units value 323e in the memory 323.

During printing or other document processing in this embodiment, (as discussed above and shown at 405 in FIG. 7) the device 320 compares the present value of the total print units used (TPUU) 323d to the threshold entries 119b in the stack 119 and sets its current page price ratio (CPPR) value 323b to the PPR 119a corresponding to the highest threshold $TPUU_{TH}$ 119b that is less than or equal to the present TPUU value 323d in the memory 323. In this manner, the device 320 consumes print units using the page price ratio applicable at the time the expended print units were applied to the device 320, and only uses the next subsequent PPR when the TPUU reaches or exceeds the corresponding threshold $TPUU_{TH}$ 119b.

Figure 9:
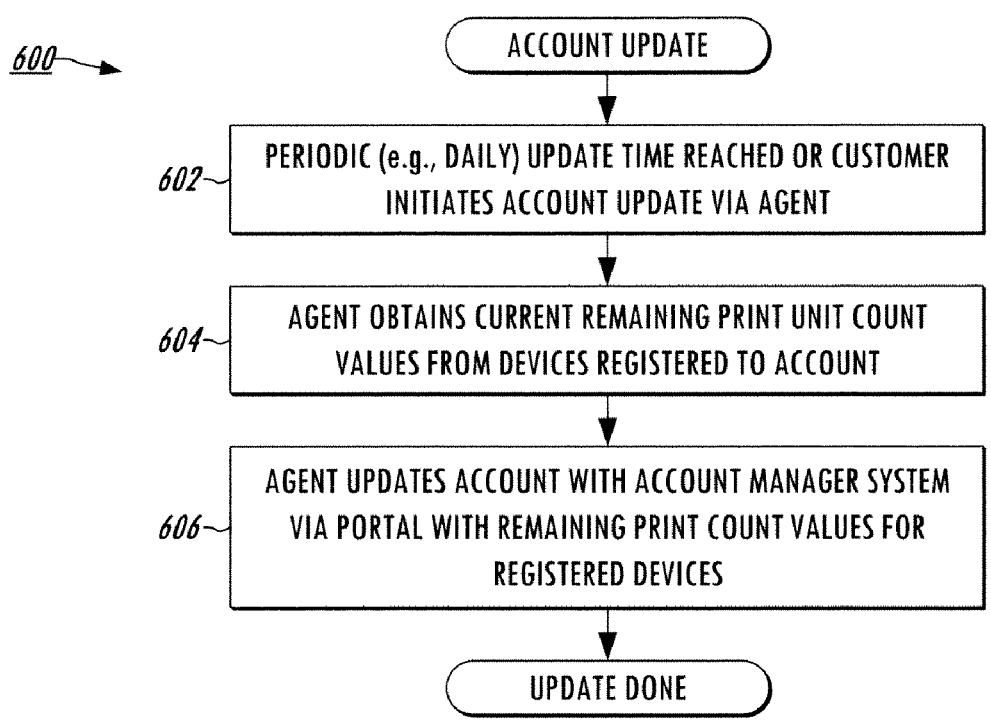
FIG. 9 is a flow diagram illustrating an exemplary process for updating account information in the account manager system of FIG. 1.

Referring also to FIG. 9, the account management component 106 is further operative to update the account information 110 of a customer account via a process 600. In one embodiment, the updating is periodic, such as daily or hourly, although aperiodic updates are possible, such as through customer initiation at any time, and the updates could be initiated based on other criteria, for example, number of prints, credit balance, etc. In practice, the customer agent component 360 can poll devices 320 connected at a given time to the customer network 302 (although the devices 320 need not be connected to the network 302 to perform document processing operations), and to obtain the device account information, and then forward the gathered data, in whole or in part, to the account manager system 104 via the portal 102. At 602 in FIG. 9, an update is initiated by a predefined periodic update time being reached or by initiation from a customer via an agent 360. At 604, the agent 360 obtains current remaining print unit count value information from devices 320 registered to an account, and the agent 360 updates the system 104 with the values and other data via the portal 102 at 606. The account manager system 104 thus receives updated remaining print unit value(s) 115c for one or more document processing device(s) 320 from a customer via the authorized agent 360 and the portal 102, and updates the registered device information 114 of the account information 110 for the specified account for the document processing device 320.

Figure 10:
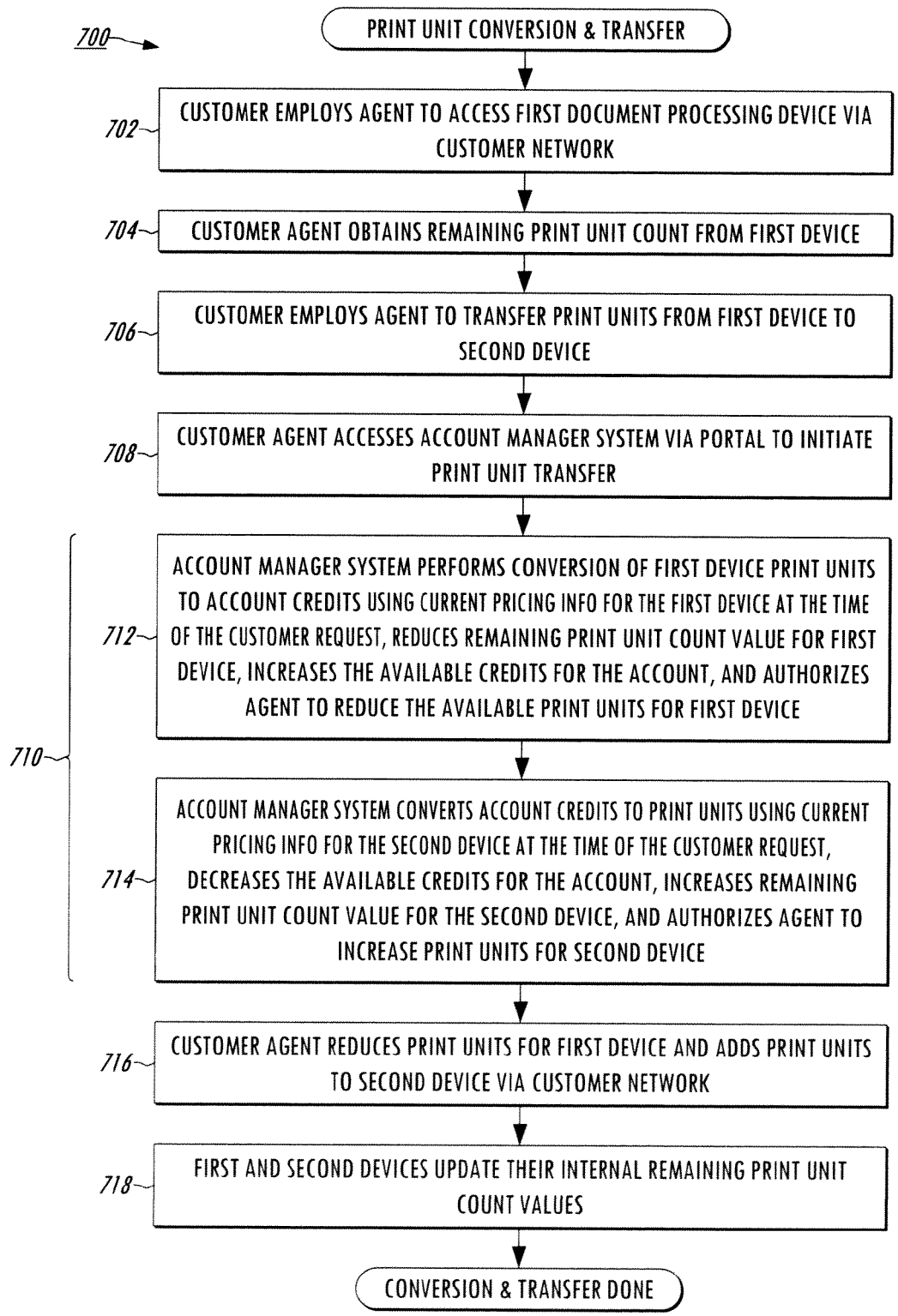
FIG. 10 is a flow diagram illustrating an exemplary process for converting previously applied print units to account credits and for transferring print units from one document processing device to another in a customer account.

Referring also to FIG. 10, a process 700 is illustrated for converting previously applied print units to account credits and for transferring print units from one document processing device 320 to another in a customer account. In one implementation, the account management component 106 directly converts print units from a first device 320 to print units for the second device 320 using the current pricing information associated with those two devices 320, generally as a single transaction from the customer's perspective, with the first device's print unit count 323e, 115c value being reduced and the second device's value 323e, 115c being increased accordingly without modifying the account credit value 111c. Alternatively, a first transaction is used to transfer print units from the first device and convert these into account credits, and then a second transaction converts account credits and applies print units to the second device, where this form of implementation is illustrated in the embodiment of FIG. 10. At 702, the customer employs an agent 360 to access a first device 320 via the customer network 302 and obtains the remaining print unit count from this device at 704. At 706, the customer uses the agent 360 to transfer print units from the first device 320 to a second device 320 registered to the account. At 708, the agent 360 accesses the account manager system 104 via the portal 102 to initiate the print unit transfer. Any number of devices may be involved in print unit or account credit transfers, as example, from one device split for transfer at some desired ratio to two other devices or credits taken from two devices and applied to a third or to the general account so credits may be later allocated to one or more devices as desired.

At 712, the account manager system 104 converts a number of print units previously applied to the specified first device 320 into a number of account credits available to the specified account according to the specified document processing device 320 and the current pricing information 112 for the specified account at the time of the requested transfer, updating the corresponding available account credits and authorizing the agent 360 to reduce the first device's remaining print unit value 323*e* (an also updating the print unit value 115*c* in the stored account information 110). At 714, the account manager system 104 applies print units to the specified second device 320 according to the customer request by converting converted account credits into a number of print units for the second device according to the current pricing information (112) for the specified account at the time of the request, and the corresponding values and account data 110 are updated, with the agent 360 being authorized to apply the print units to the second device. At 716, the agent 360 updates the first and second devices 320, and the devices 320 update their internal count values at 718.

Figure 11:
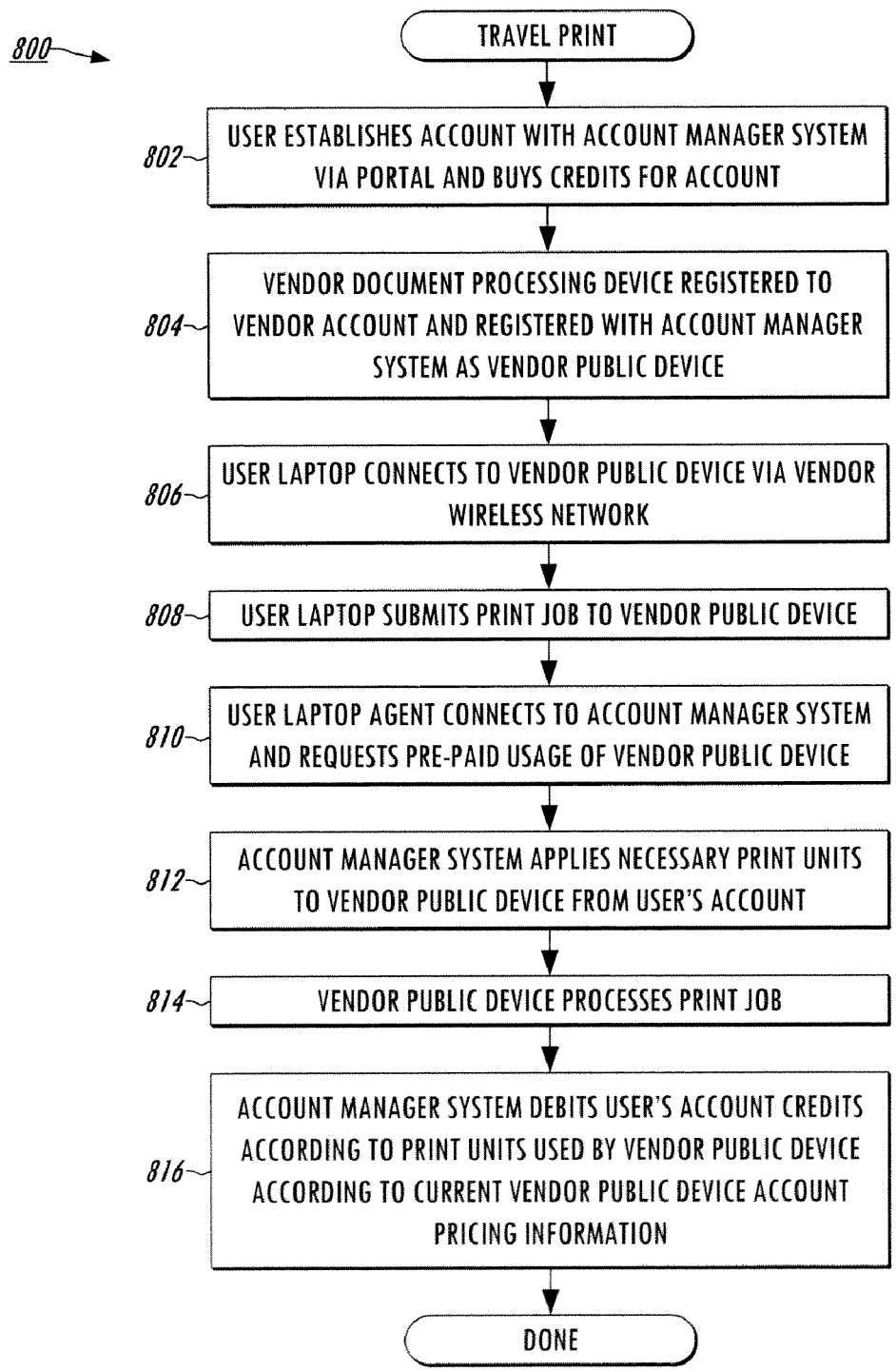
FIG. 11 is a flow diagram illustrating an exemplary process for a user to perform printing operations on a public device registered to a vendor account using credits from the user's account via the account management system and techniques of the disclosure.

Referring also to FIG. 11, an exemplary process 800 is shown for a user to perform printing operations on a public device 320 registered to a vendor account using credits from the user's account via the account management system 104. This process is implemented via the account manager system 104, with the account management component 106 allowing a user at 802 to establish a user account and to add credits to the user account (e.g., 510 in FIG. 8 above) via a user-authorized agent 360 and a portal 102. At 804, a vendor is allowed to register a particular document processing device 320 to a vendor account as a public device 320 via a vendor-authorized agent 360 and the portal 102. The user at 806 connects to the vendor public device 320 via a vendor network. In one situation, the vendor is a print/copy service with a wireless network in their lobby, and with one or more printers, copiers, fax machines, or other document processing devices 320 designated for public use (by registered users) and registered to the vendor's account. A user, such as a business traveler, having a registered user account with the manager system 104 enters the vendor site with a laptop computer, and accesses the vendor's wireless network and discovers one or more printers available to print a job for the user. At 808, the user submits a print job to a selected vendor printer device 320 (a public device), and an agent component 360 on the laptop computer connects to the account manager system 104 via a portal 102 to request usage of the vendor's public device 320.

The account manager system 104 receives the request at 810, and applies available print units at 812 to the public device 320 (associated with the vendor's account) via a vendor-authorized agent 360 operatively coupled with the public device 320, and the manager system 104 converts a number of credits currently available to the user account into a number of print units according to the public device 320 and the current pricing information 112 for the vendor account at the time of the request. The vendor device 320 then prints the user's job at 814, and the account manager system debits the user's account credits at 816 according to the number of print units used by the vendor public device 320, based on the pricing information established in the vendor's account.

The disclosed methods and account manager systems thus facilitate accounting, provisioning, and controlled usage of a variety of different devices 320 associated with an account, allowing pricing for printing, scanning, faxing, support etc. to be tailored according to the type of service or product model, as well as selective inclusion of costs for consumables 322, service, and support according to specific accounts established for different customers, and for different locations or regions, and any other account-specific factors arranged by a manufacturer implementing the account management system 104 and/or by a reseller 200. The architecture, moreover, allows pricing changes to be made easily by simply updating the account credit-to-print unit conversion information (pricing information 112) at the management system data store. The system 104 also facilitates transfers of prepaid print units from one device to another as well as from a device 320 back to a customer account, thereby enhancing a customer's ability to manage printing devices and users. The customer is also able to selectively include various print unit pricing options, including service, consumables, and/or support, which can vary with the device age and the amount of usage within a given time period, thereby providing better adaptability for valued customers. The plan terms and provisions, moreover, are easily altered by changes to the stored account information 110 by agreement with specific customers. The system also allows consumables, such as toner cartridges, to be transferred from one device 320 to another, with the receiving unit reading the consumable identifier (e.g., serial number) and updating the management system account information accordingly. Moreover, the systems and methods disclosed above allow a specific device 320 to operate at predetermined reduced functionality levels if the device print units become depleted, for instance, where the printer is disconnected from the network 302, thereby allowing the customer to maintain operation until more print units can be applied via the account manager system 104.

Referring also to FIGS. 12-16, certain embodiments of the account manager system 104 advantageously provide automated or semiautomatic refunds for customers who return spent consumable products 322 used in or with the document processing devices 320, including without limitation toner, toner or ink cartridges, ink, replaceable fuser modules/components, replaceable imaging units, waste toner bins, transfer belt, or other non-print media items or materials consumed by the device 320 during document processing operations. In conventional return/refund programs, the customer is asked to return empty toner cartridges or other spent consumable items to the manufacturer or reseller 200, and upon receipt thereof, the customer is sent a refund payment or is provided with a coupon usable to purchase further products from the manufacturer/reseller. In practice, however, customers have not consistently complied with such programs. In order for manufacturers or resellers to successfully implement a recycling provision of a consumable product lease arrangement, fuller customer participation is facilitated by the account manager system 104. In this regard, the account manager system 104 is configured in certain embodiments to initiate refunds by automatic addition of credits to the customer account, and in certain cases, to also perform direct application of print units to the specific document processing device 320 from which a returned consumable product 322 came. Thus, while manufacturers and resellers 200 cannot realistically force customers to return consumables 322 designated as part of a recycling provision of a product lease or consumable purchase program, the automated refund aspects of the account manager system 104 can provide an effective incentive for customer compliance beyond that possible in conventional programs. The system 104 thus facilitates materials reclaim and socially responsible expended item disposal or recycling for consumables 322 provided as part of the prepaid program as well as for externally sourced consumables.

Figure 12:
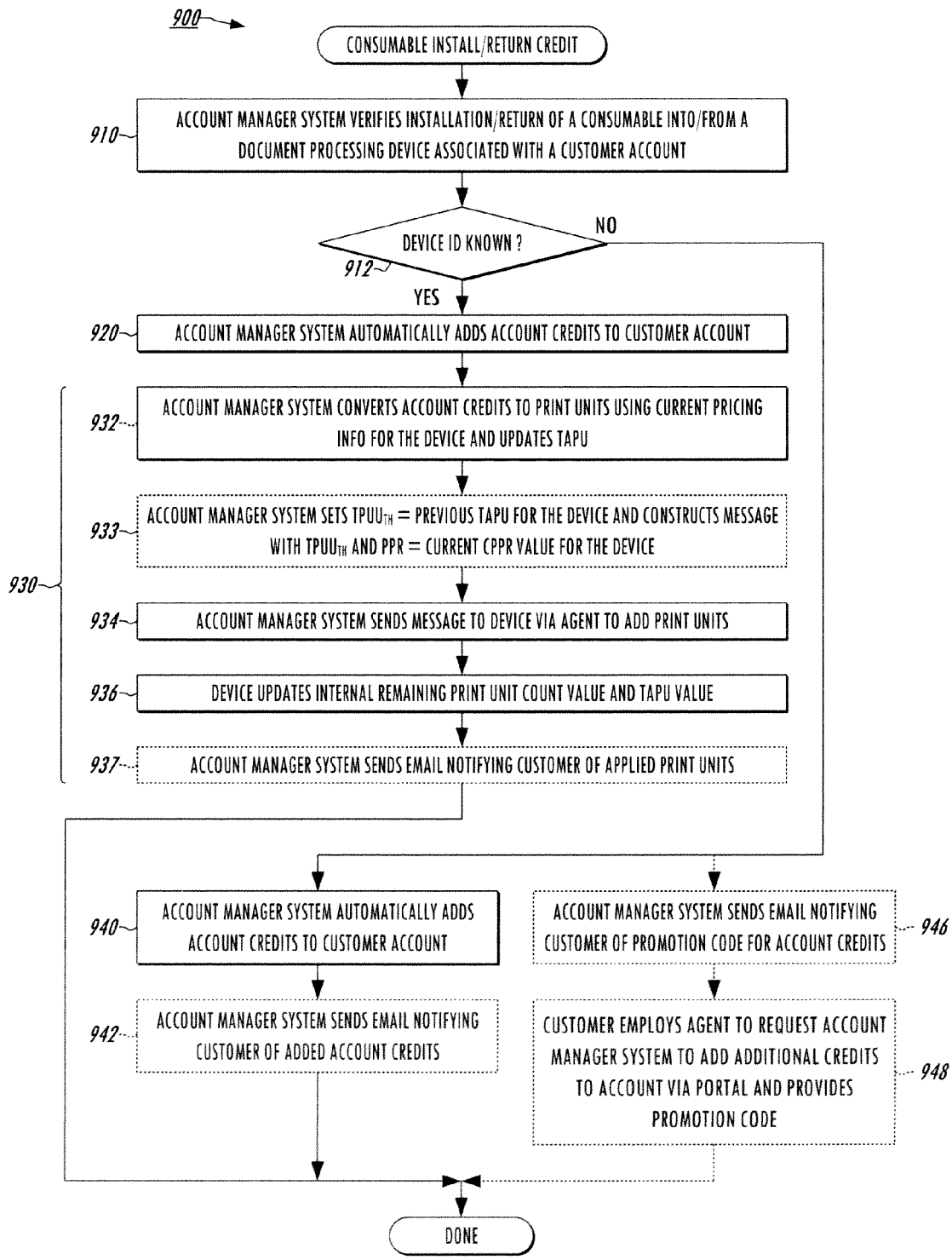
FIG. 12 is a flow diagram illustrating an exemplary process in which the account manager system automatically adds account credits and applies device print units for a returned and/or installed consumable product.

One exemplary process 900 is shown in FIG. 12, in which the account manager system 104 automatically adds account credits and if possible, applies device print units as a credit or refund incentive for a returned and/or newly installed consumable product 322. At 910, the account manager system 104 verifies that a replacement consumable 322 has been installed into, or that a replaced consumable 322 has been returned from, a document processing device 320 registered to a customer account. The account manager system may verify the association of an installed/returned consumable 322 with a particular customer account by any suitable means or techniques, and various techniques may be used to potentially associate a returned consumable 322 with a particular document processing device 320, several of which are illustrated and described in greater detail in connection with FIGS. 13-16.

If the identity of the source device 320 (device ID) is known (YES at 912), the account manager system 104 is programmed to automatically add account credits to the associated customer account at 920 (e.g., increasing the available credits value 111c in the account information 110 for that customer account in FIG. 3), and to automatically apply print units at 930 to the identified document processing device 320 (an apply operation similar to that described at 524-528 in FIG. 8 above, without requiring customer action). In certain embodiments, the return refund can be performed as a single operation to apply a full or partial refund amount directly as applied print units without first adding account credits.

In the example shown in FIG. 12, the account manager system 104 converts account credits (e.g., those added at 920) to print units at 932 using the current pricing information 112 (FIG. 3), and updates the total applied print units (TAPU) value 115e in the corresponding device subaccount information 115. In one embodiment, account manager system 104 updates the stack 119 at 933 with a new pair of page price ratio (PPR) and threshold values $TPUU_{TH}$ 119a and 119b, respectively, (FIG. 5) by setting the new $TPUU_{TH}$ to the pervious TAPU value (i.e., the total applied print units (TAPU) value before the current application of further print units). At 934, the account manager system 104 sends a message to the device 320 to add the applied print units (via the agent 360). At 936, the device 320 updates its internal remaining print unit count value 323e (FIG. 4) and its total applied print units (TAPU). As in the user-requested print unit application described above, the valuation of the print unit cost is done at the time of application of print units to the device 320, and the system 104 tracks the refund transaction. In certain embodiment, moreover, the account manager system 104 sends an email at 937 to notify the customer of the application of print units to the particular document processing device 320.

In situations where the customer identity is known, but the source device 320 is unknown (NO at 912), the account manager system 104 can be configured to either add account credits and notify the customer or to notify the customer and provide a means for the customer to initiate addition of account credits for the refund amount. In one example (940 and 942 in FIG. 12), the account manager system 104 automatically adds the refund amount of account credits to the associated customer account at 940 by increasing the available credits value 111c in the account information 110 (FIG. 3), and may send an email to the customer at 942 with a notification that credits have been added. In this regard, the emails sent to the customer at 937 and 942 preferably include an indication of the type of consumable 322 that was returned and the amount of credits applied (as well as the identity of the device 320 to which print units were added at 937) in order to provide timely information that will encourage/reinforce the customer's actions in returning used consumable products 322 to the manufacturer/reseller.

In another example (946 and 948 in FIG. 12), if the customer identity is known but the specific source device 320 is unknown (NO at 912), the account manager system 104 sends an email to the customer indicating that the returned consumable 322 has been received (and/or a new consumable 322 has been installed), and providing a promotion code for a given amount of account credits. The email may provide a website link or instructions for the customer to access the account manager system 104 (e.g., via an agent 360 on a customer computer 330 and the portal 102 in FIGS. 1 and 2 above), and the customer then uses the agent 360 at 948 to initiate addition by the account manager system 104 of the refund amount of account credits by entering the promotion code. As noted in the process 900 of FIG. 2, the account manager system 104 may be configured to initiate one or more automatic or semiautomatic consumable refund actions, such as adding account credits, applying print units, etc., at various times, including without limitation when a replacement consumable 322 is installed into a device 320, when the consumable 322 is received at a return center, or both. For example, in one implementation, a partial refund may be provided when the product 322 is initially installed, and the remainder of the refund may be provided when the spent consumable 322 is returned.

Figure 13:
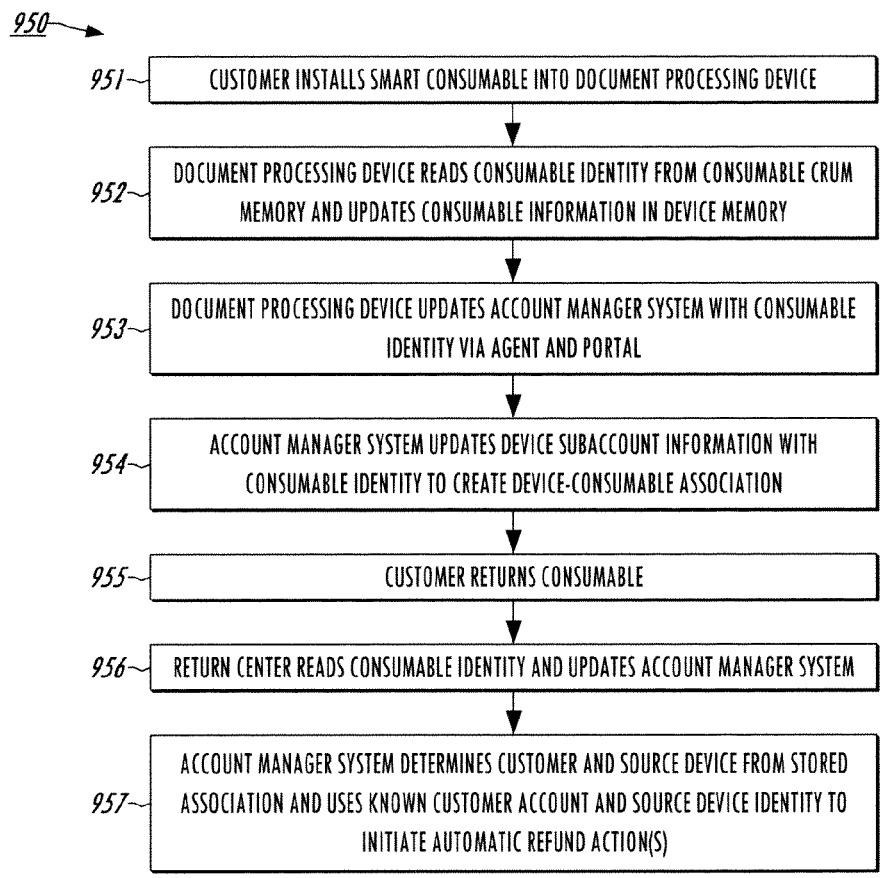
FIG. 13 is a flow diagram illustrating an exemplary process in which a document processing device reads the identity from an installed consumable and notifies the account manager system which establishes a device/consumable association used to initiate one or more automatic refund actions.

Referring also to FIG. 13, the consumable product 322 in some instances may include onboard electronics with readable and/or writable memory, such as a customer replaceable unit monitoring (CRUM) memory 322c (FIG. 4), to facilitate determination by the account manager system 104 of an association between a specific device 320 and a returned/installed consumable 322. FIG. 13 shows a process 950 in which a customer installs a consumable product 322 into a document processing device 320 at 951. At 952, the device 320 reads a consumable identity (e.g., serial number or other identifying information) from the CRUM memory 322c of the installed consumable product 322 (e.g., upon initial consumable installation or anytime thereafter). Alternatively, such information can be entered into the device 320 by the customer via a device user interface or via agent application 360 on a customer computer 330 (FIG. 1 above). The device 320 may store the consumable identity (ID) in its internal memory at 952 as consumable information 323f (FIG. 4). At 953, the device 320 forwards the consumable ID to the account manager system 104 for storage in the account information 110 (via an agent 360 and the portal 102), and the account manager 104 stores the consumable ID 117 in the corresponding device subaccount information (FIG. 3) at 954. At this point, the account manager system 104 has an established association between a specific document processing device 320 and a specific consumable product 322 via the account information 110. At some point in time, the customer returns the consumable 322 at 955 to the manufacturer or a reseller 200. At the return center, the consumable identity is read at 956, and the return center (e.g., the manufacturer or reseller 200 or other return site having network access to the account manager system 104) updates the account manager system 104 with the identity of the received consumable product 322. At 957, the account manager 104 uses the received consumable ID to index the account information to ascertain the identity of the associated device 320 and initiates one or more automatic refund actions as outlined above (e.g., adding account credits and possible applying print units).

Figure 14:
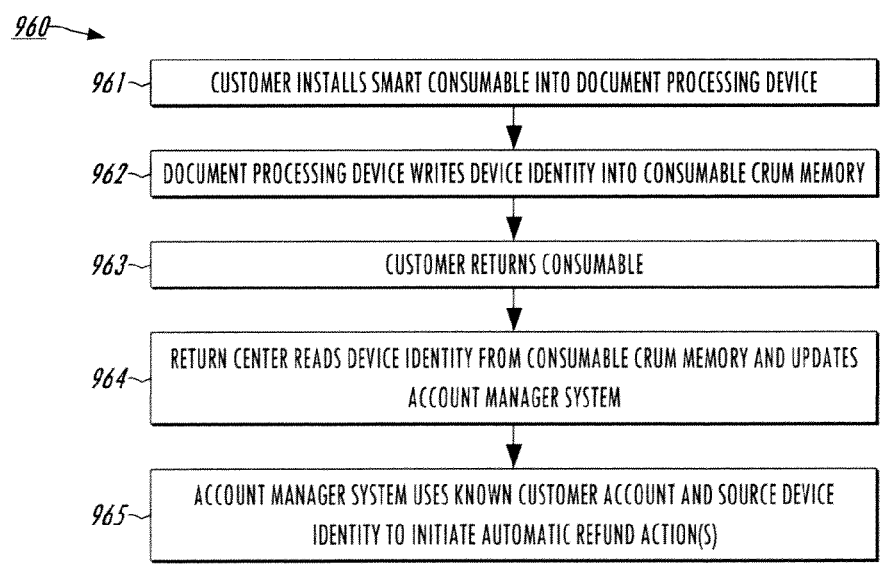
FIG. 14 is a flow diagram illustrating another exemplary process in which a document processing device writes a device identity into a customer replacement unit monitoring (CRUM) memory of an installed consumable for later use in initiating automatic refund actions when the consumable is returned.

Referring to the process 960 in FIG. 14, in another implementation, the consumable product 322 includes a writable memory and the device 320 into which the consumable is installed at 961 writes its identity (the device's identity) into the consumable memory (CRUM) at 962 for use in initiating automatic refund actions when the consumable is returned or at installation or both. In one implementation of this scenario, when the account manager system 104 determines that a consumable level is low for a given device 320 (e.g., through monitoring of the TPUU values 115f in FIG. 3), a replacement consumable product 322 is shipped to the customer, for example, along with a return envelope for the used consumable for return shipment. Once the consumable 322 is returned to a recycling center at 963, the CRUM data can be scanned and the serial number (identity) of the received consumable product 322 is sent to the account manager system 104 at 964. At 965, the account manager system 104 initiates one or more automatic refund actions based on the identified source device 320 and the known consumable identity.

Figure 15:
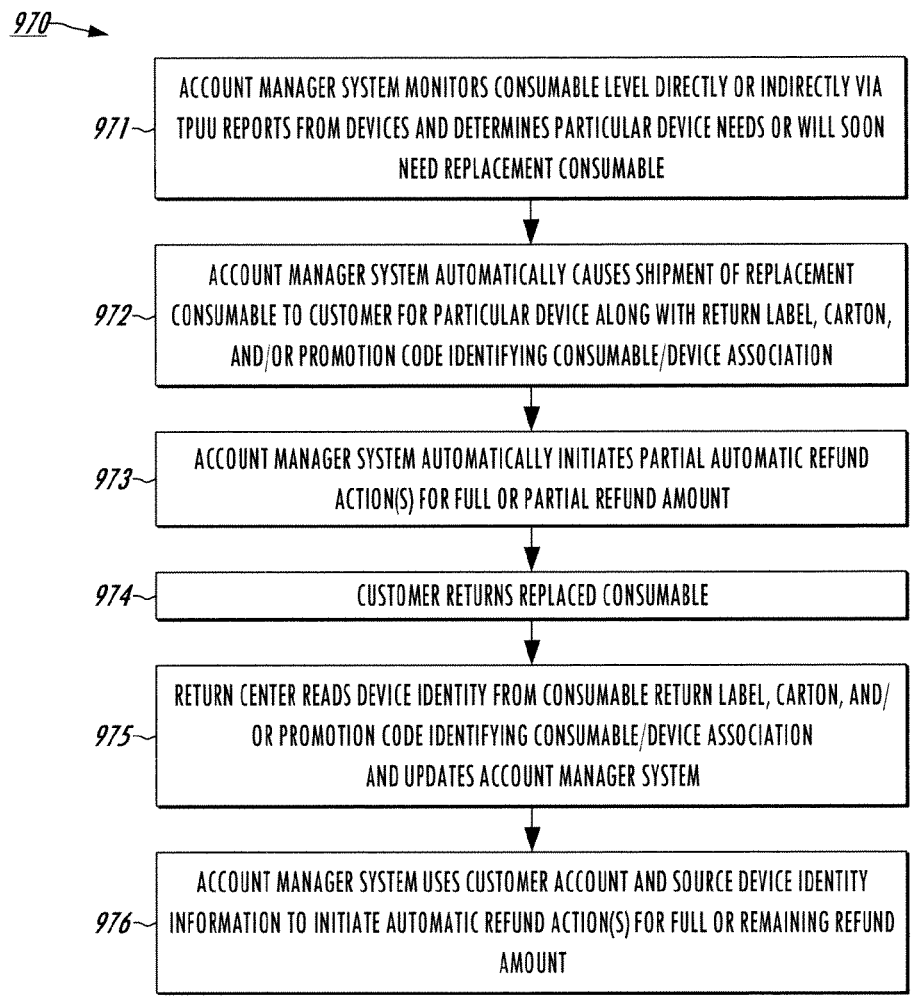
FIG. 15 is a flow diagram illustrating another exemplary process in which the account manager system initiates shipment of replacement consumables based on monitored consumable levels and performs automatic refund actions based on shipment and/or return of replaced consumables.

Referring now to FIG. 15, the account manager system 104 may employ the account information 110 (FIG. 3) in a process 970 for initiating refund actions for consumable products 322 that do not include onboard electronic memories. In this regard, serial numbers or other identity information can be tracked by the system 104 along with other customer registration information so that the automatic or semiautomatic refund credit process may be applied to recycle items that have a serial number but do not include a CRUM or other means of positive correlation to the document processing device 320 that the consumable 322 was associated with. Serial number information of such recycled consumables 322 can be linked in the system 104 to the device 320 for which they were initially sent to be used such that when a customer returns the consumable 322, credit is provided to the corresponding customer account.

At 971 in FIG. 15, the account manager system 104 monitors one or more consumable levels (e.g., toner level(s)) for one or more devices 320 registered to an account, such as through reports forwarded from the monitored devices 320 and corresponding updates to the account information 110. For example, the devices 320 report updates to the TPUU (total print units used) value that are stored as values 115$f$ in the device subaccount information 115 for the devices 320 (FIG. 3). The account manager system 104 can track these values, in conjunction with knowledge or estimation of the TPUU value at which a particular consumable 322 was installed in the device 320 and known capacity values of the consumable 322 (e.g., number of print units possible per consumable product 322), and determine when a particular document processing device 320 needs or will soon need a replacement consumable 322. At 972, the account manager system 104 automatically initiates shipment of replacement consumables 322 based on monitored consumable levels to the customer for a particular device 320 (with or without corresponding email or other notice of shipment). The replacement consumable 322 is shipped in certain embodiments along with a return label, carton, and/or promotion code identifying the consumable/device association. At the time of the shipment, in one embodiment, the account manager system 104 automatically performs one or more automatic refund actions at 973 for all or a portion of the refund value, which can be addition of account credits and possibly automatic application of print units as discussed above. At some point, the customer returns the replaced consumable product 322 at 974. When the consumable 322 is received at a return center at 975, the identity of the source device 320 is read from the return label, carton and/or from the promotion code, and the account manager system 104 is updated (e.g., via the portal 102) with the device identity information. At 976, the account manager system 104 uses the customer account and source device identity information to initiate one or more automatic refund actions.

Figure 16:
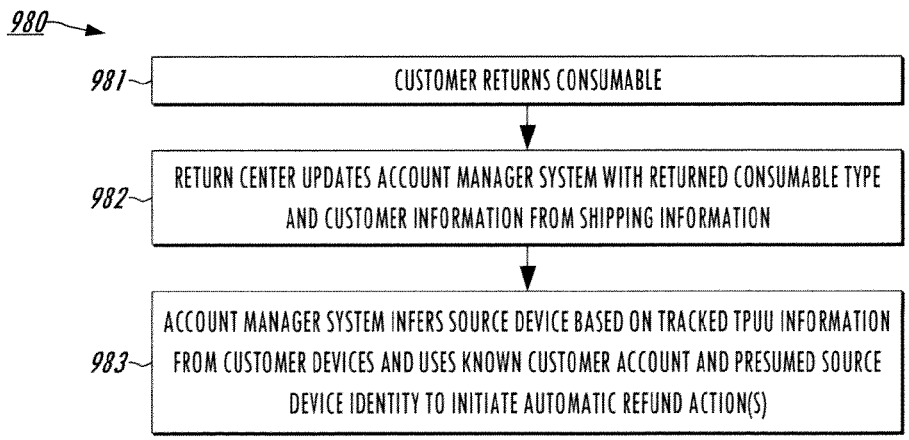
FIG. 16 is a flow diagram illustrating another exemplary process in which the account manager initiates automatic consumable replacement actions based on inferred association of returned consumable with a document processing device identified based on total print units used information.

FIG. 16 illustrates another exemplary process 980 in which the account manager initiates automatic consumable replacement actions based on inferred association of returned consumable 322 with a document processing device 320 identified based on total print units used TPUU information 115$f$ of the account information 110 (FIG. 3). At 981 in FIG. 16, the customer returns a consumable product 322, and the return center updates the account manager system 104 at 982 with the returned consumable type and customer information from the corresponding shipping information. Knowing the customer identity, the account manager system 104 infers the identity of the source document processing device 320 at 983 from which the consumable 322 was returned based at least partially on tracking of the TPUU information 115$f$ (FIG. 3) for one or more devices 320 registered to the customer's account. For example, if it is known that the returned consumable device has a print unit capacity of X print units, the account manager system 104 can ascertain from the account information 110 the registered device subaccount(s) 115 for which the TPUU has changed by X units since shipment of a previous replacement consumable of the same type to infer the source device identity. Using this inference, the account manager system initiates one or more automatic refund actions, including adding credits to the corresponding customer account, and optionally sending a notification email to the customer and/or applying print units to the presumed source device 320.

The automatic or semi-automatic provision of account credits and/or print unit application for returned consumables 322 advantageously encourages customer participation in consumable return/recycling programs since customers readily see the benefit for return compliance in their account credit and/or print unit balance, particularly when the account manager system 104 provides a timely email notification. Moreover, these techniques provide lower administration costs for the manufacturer/reseller 200 compared with conventional monetary compensation or coupon programs for returned consumable products, since a customer account already exists that can simply be credited by an amount determined by contractual return/refund provisions and/or as modified by special enhanced refund offers (e.g., limited-time, customer-specific, region-specific, or other special offers, etc.). From the customer's perspective, participation is encouraged by lower operation costs associated with the office equipment and the customer can track their recycle participation by device 320 and/or department 310.

Figure 17:
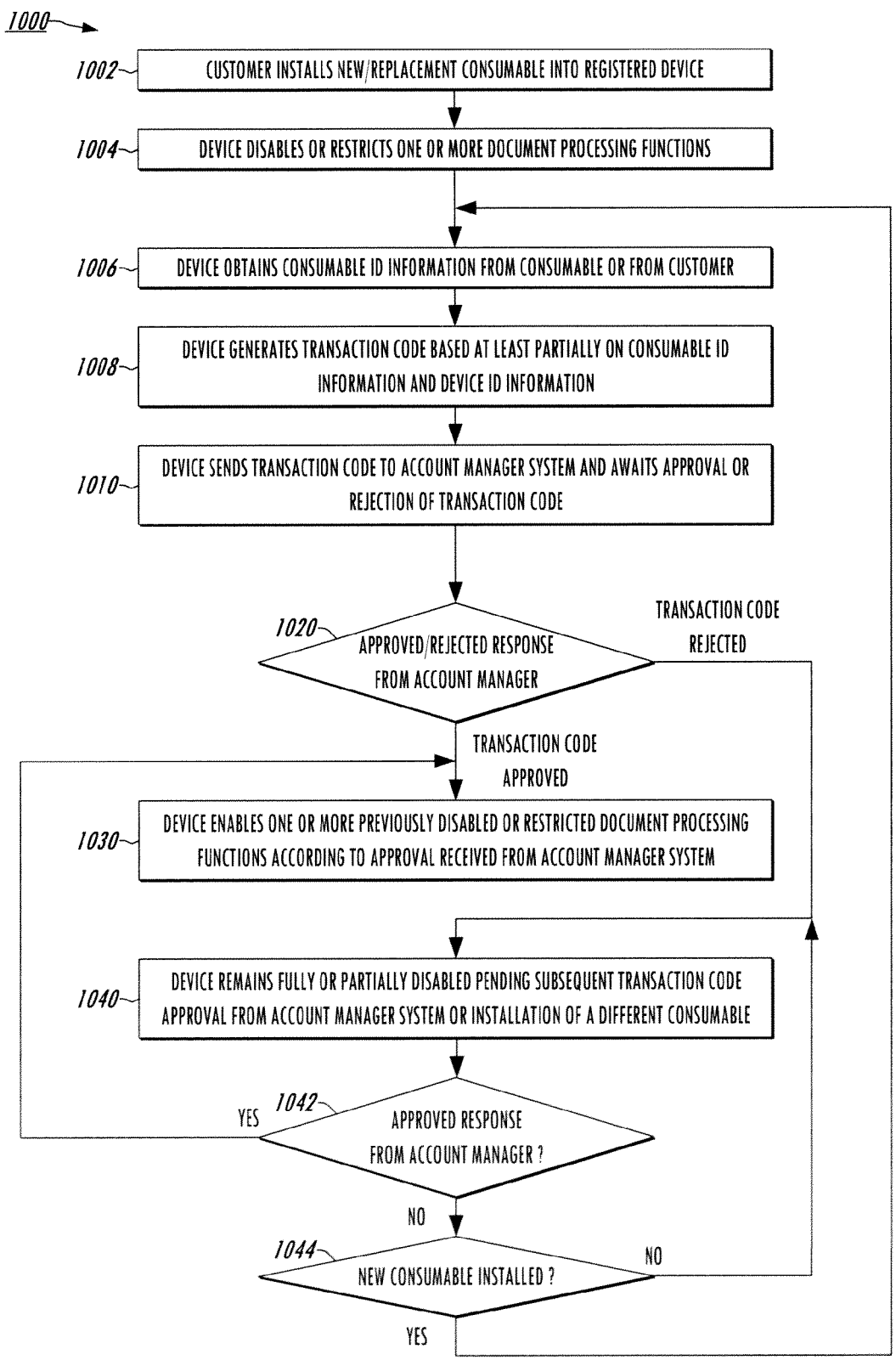
FIG. 17 is a flow diagram illustrating an exemplary method for validating consumable usage in a document processing device registered to an account managed by the account manager system of FIG. 1.

Turning now to FIG. 17, the account manager system 104 and the document processing devices 320 provide control and tracking of consumable usage via a transaction or validation code generated by the document processing devices 320 in response to installation of new or replenishment consumables 322, which is then provided to the account manager system 104 for validation. FIG. 17 illustrates an exemplary process 1000 for device operation and consumable usage management in which a customer 300 installs a new or replacement consumable 322 into a registered device 320 at 1002. At 1004, the device 320 disables and/or restricts one or more document processing functions, and obtains consumable ID information from either the consumable 322 and/or from the customer 300 at 1006. In one example, when the consumable 322 is installed into the device 320, the device 320 reads the ID information 322*id* from a CRUM memory 322*c* of the consumable 322 (FIG. 4 above). Any functional or operational impact of the restriction/disablement at 1004 may not be noticed by the user in a normal consumable replacement process when an approval is issued prior to the customer resuming use, particularly for consumables 322 having internal CRUM memory devices 322*c* from which the consumable ID information 322*id* is obtained for automatic generation of the transaction code by the device 320. The consumable ID information 322*id* in certain embodiments includes one or more of a consumable identity, a consumable type, a geographical indicator which indicates a geographical region from which the consumable 322 was purchased, and/or a program participation indicator indicating whether the consumable 322 was obtained under a prepaid account. The consumable ID information 322*id* in one example could include a serial number providing a globally unique identification of that particular consumable product 322, which may be supplemented with a code that represents the market the consumable 322 was intended to be used in. In this regard, a valid geographic indicator in certain embodiments is indicative of the location of the imaging device 322 for which the consumable product 322 is destined when shipped, and may but need not always represent the geographic location of purchase, for instance, where the consumable 322 was automatically shipped to a customer 300 based on anticipated depletion of a consumable supply for a particular device 320. Moreover, there may be multiple prepaid account indicators for different types of accounts, in which embodiments the applicable indicator for the registered account will be considered in the validation process.

In another example, the consumable 322 may not include a CRUM memory 322C, and the device 320 prompts the customer/user (e.g., via the user interface 329 in FIG. 4 above) to enter one or more pieces of consumable identification information into the device 320, and/or the customer 300 may enter such consumable ID information into the device 320 via an agent 360 operating on a customer computer 330a (FIG. 4 above). For example, the customer may obtain consumable ID information from packaging and/or shipping invoices received with the consumable item 322, which is then used by the device 320 at 1008.

The device 320 generates a transaction code at 1008 based at least partially on the consumable ID information 322id associated with the installed consumable 322, and also on the device ID information 323g (FIG. 4 above). In this regard, since the device 320 is registered to the customer account, the account manager system 104 also includes device serial number information 115a (FIG. 3 above), and the device 320 itself either stores device ID information 323g in its internal memory 323 as shown in FIG. 4, and/or the device 320 may prompt the customer/user via the user interface 329 to enter the device ID information 323g, for example, from a nameplate or label on the device 320 itself. With the consumable ID information and the device ID information, the device 320 generates the transaction code at 1008 using any suitable algorithm or technique by which a code can be constructed to uniquely identify a pairing of a particular installed consumable product 322 with a particular document processing device 320. At 1010 the device 320 sends the transaction code to the account manager system 104 and awaits approval or rejection of the transaction code.

In certain embodiments, the device 320 automatically sends the transaction code to the account manager system 104 via established network connections (e.g., networks 302, 10, portal 102 in FIG. 1), and the in certain situations, for instance where one or more network connections are inoperative, the transaction code validation process can be securely accomplished with manual steps. For example, the device 230 may render the generated transaction code (e.g., as a code string displayed on the device user interface 320 in FIG. 4 above, which may be rendered via menu selection, with/without password/authorization entry protection). In this case, the customer/user obtains the transaction code from the interface 329 and provides the transaction code by any suitable means to the account manager system 104 for validation (e.g., verbally by telephone to an operator at the account manager site or via another acceptable method). The account manager system 104 then verifies the transaction code (accept/reject) and provides a validation code string for verbal or other conveyance to the customer/user who inputs the validation string into the document processing device 320 manually via the user interface 329. The device 320 determines from the entered string whether or not the transaction code was accepted. Thus, even absent a communication link allowing automatic handshake on the validation process, the transaction code generated by the device 320 can be conveyed by any acceptable means to the account manager system 104 and the validation determination is provided to the device 320 manually.

At 1020, the device 320 awaits an approved/rejected response from the account manager system 104. If the transaction code is approved, the process 1000 proceeds to 1030 where the device 320 enables all or a subset of document processing functionality according to the approval received from the account manager system 104. Thus, one or more of the previously disabled document processing functions are re-enabled at 1030 once the account manager system 104 has indicated to the device 320 that the consumable 322 is accepted for use in the device 320. In other situations, only a subset of the previously disabled document processing operation functionality may be re-enabled at 1030, for example, where the account manager system 104 separately prompts the customer to verify the origin of the consumable device 322, and/or determines that the consumable 322 was obtained from a legitimate source, even though the consumable 322 was not obtained through the prepaid program account.

If the transaction code is rejected at 1020, the process 1000 proceeds to 1040 where the device 320 remains fully or partially disabled pending subsequent transaction code approval code from the account manager system 104 and/or pending installation of a different consumable 322 into the device 320. In such a case, a determination is made at 1042 as to whether a subsequent approved response is received from the account manager system 104, in which case (YES at 1042) the process 1000 proceeds to 1030 as described above, with the device 320 enabling all or a subset of document processing functionality that was previously disabled according to the account manager system approval. Otherwise (NO at 1042), a determination is made at 1044 as to whether a new consumable 322 has been installed in the device 320, and if so (YES at 1044), the process 1000 returns to 1006 as described above for generation of another transaction code and submission thereof to the account manager system 104 for validation.

In certain embodiments, the above described functionality of the document processing device 320 is implemented in whole or in part using the microprocessor 321 or other controller or programmable processing element of the device 320. The controller 321, moreover, may be configured or otherwise programmed to indicate receipt of a rejected transaction code to the user via the user interface 329 (FIG. 4). This might prompt the customer to separately contact the account manager system 104 (e.g. via a customer computer 330a and an agent 360 as shown in FIG. 4) for follow-up regarding the nature of the invalidity determination and/or for other remedial actions in order to resume document processing functionality.

In general, the process 1000 provides an automated or semi-automatic mechanism by which consumable usage may be tracked and monitored with the devices 320 communicating transaction codes to the account manager system 104 via the communications interface 326 (FIG. 4), the customer network 302, the portal 102, and the server 100. In some embodiments, the consumable ID information 322id further includes a program participation indicator indicating whether the consumable 322 was obtained under a prepaid account. Since the memory 323 in the device 320 includes a remaining print value 323e indicating the number of print units currently available to enable document processing device operations, the processing element 321 continues as described above to determine a job cost print unit value for performing a given document processing operation for document processing jobs (e.g. at 406 in FIG. 7 above) and generally operates to selectively decrement the remaining print value 323e according to determined job cost print unit values as document processing jobs are preformed.

In certain embodiments, the programmable processing element 321 of the document processing device 320 is configured if the consumable ID information 322id does not indicate that the consumable 322 was obtained under the prepaid account, to refrain in whole or in part from decrementing the remaining print unit value 323e in association with at least one document processing operation for a given document processing job. In this manner, the device 320 accommodates situations in which the customer may be operating the device 320 in a mixed mode with a portion of toner consumable 322 provided through the account program, with other toner consumable(s) 322 being obtained outside the program. The device 320 accommodates such a mixed mode by stopping the print unit decrementing, and/or by decrementing print units at a slower rate for usage of a particular toner cartridge consumable 322 that was identified as not being obtained through the account program. In this regard, the device 320 may operate to track how much black, cyan, yellow, and/or magenta toner consumable 322 is used for a given document processing job (for example as determined as part of the job cost estimate by the device 320), and the device 320 decrements allocated print units at a rate that corresponds to the amount of toner in consumable 322 actually used in processing a given document job. In this manner, the customer is charged print units only for consumable products 322 obtained via the account program, and the account manager system 104 thus facilitates continued document processing operation for the customer while tracking the usage of non program consumables 322 present in the registered devices 320. In this regard, consumables 322 may include any form of material, component, etc. that is replaceable in a document processing device 320 such as toner, and may be without limitation a fusing unit, imaging unit, transfer roller, and so forth.

In other situations, the selective validation/authorization functionality of the account manager system 104 can be used to control document processing device operation by selectively reducing the number of print units available to a given printer device 320 to zero or to some other threshold value in order to effectively disable the device 320 as a control mechanism. In this regard, the devices 320 are generally already configured to stop working (in whole or in part) when their applied remaining print units value 323e (FIG. 4) goes to zero or some other predefined value, and the account manager system 104 can use this device operation as a control mechanism to prevent and/or inhibit the use of non program consumable products 322 within the devices 320. It is further noted that the consumable ID information obtained by the device 320 may be constructed so as to include a flag or other indicator of whether or not the consumable 322 was initially shipped by a manufacturer in accordance with a particular prepaid program account. In this fashion, the handshaking between the device 320 and the account manager system 104 may include this information directly or indirectly in the generated transaction code and/or the validation thereof in order to facilitate timely authorization from the account manager system 104 upon installation of a new consumable 322 into a given document processing device 320.

The process 1000 of FIG. 17 is further useful in identifying and controlling unauthorized usage of program consumables 322 when one or more prepaid accounts are terminated. In this regard, a customer 300 may initially participate in a prepaid program for one or more document processing devices 320, but at some point may determine that document processing usage no longer justifies the continued participation in the program. In many such situations, consumable products 322 within one or more devices 320 will have significant remaining useful life (e.g., the consumable 322 is not yet depleted). In this case, the customer may chose to refrain from returning the unused consumable 322 to the program operator/manufacturer, and may instead attempt to install non-depleted consumables 322 into another document processing device 320 that remains active in the prepaid program. In this situation, the device 320 into which the consumable 322 is installed will ascertain the consumable ID information (e.g. from a CRUM memory 322c in the consumable 322) generate a transaction code, and forward this to the account manager system 104.

The account manager system 104, in turn, will note the invalid pairing of the consumable 322 with the program device 320, and will notify the customer of the unauthorized attempted usage of the consumable 322. At this point, moreover, the account manager system 104 can advantageously notify the customer 300 that the installed consumable 322 was formerly part of the prepaid program, and indicate to the customer (e.g. via the user interface 329 of the device 320 and/or via an agent 360 on a customer computer 330) return processing instructions, which may remind the customer that hold back provisions of the previously decommissioned program account participation may be refunded to the customer upon return of the consumable item 322 to the manufacturer/reseller. Thus, the above described process 1000 provides a feedback mechanism to further encourage customer participation in proper consumable return programs, even when all or a portion of a customer account has been terminated. An alternative to return of one or more consumables 322 with remaining life is for a customer to provide payment for the unused portion of life remaining, in which case, upon validation of the arrangement, provision would be made for the consumable product 322 to maintain functionality via the account manager system 104 which would thereafter validate pairing of the 'purchased' consumable 322 with a device 320.

Figure 18:
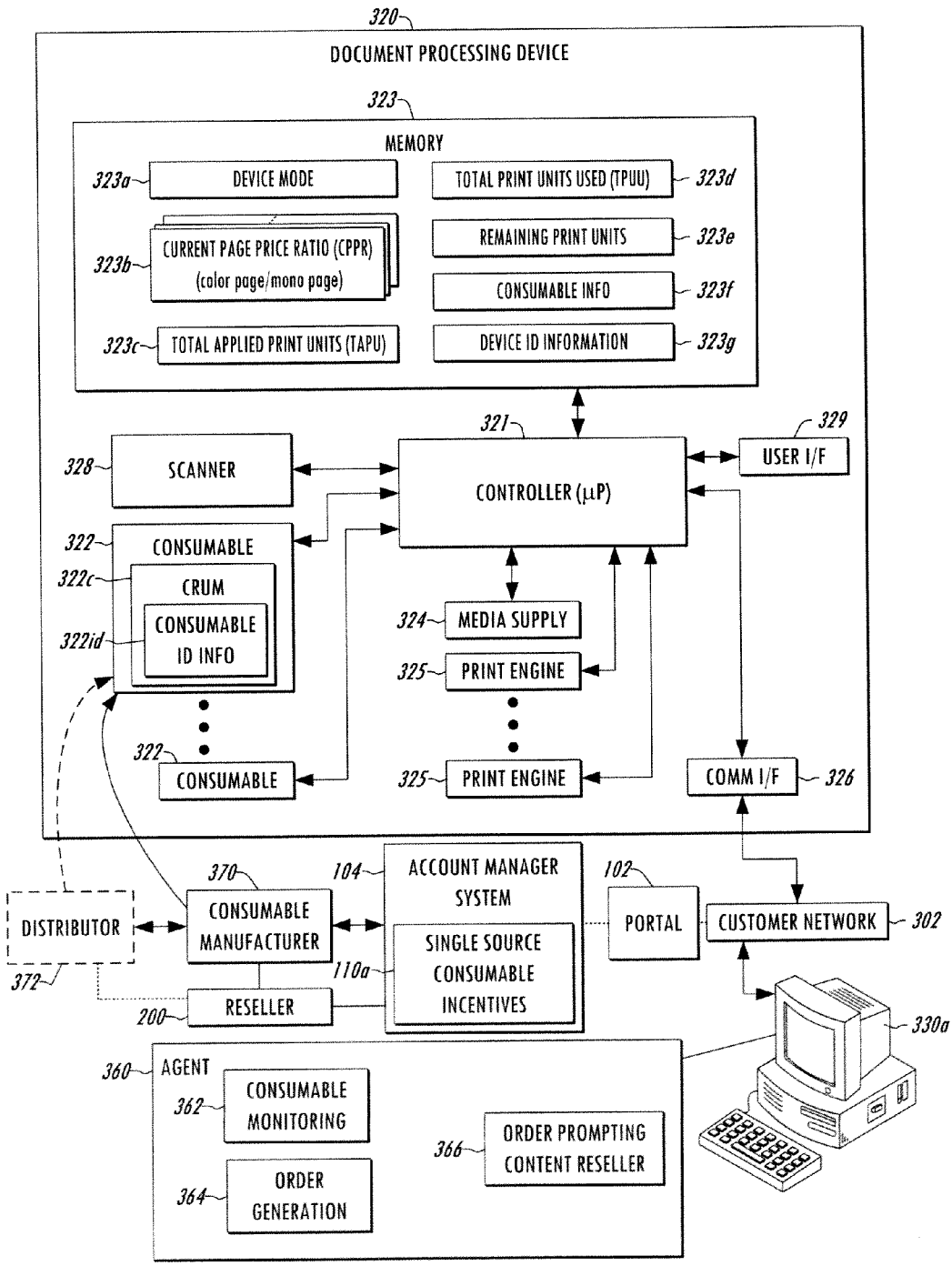
FIG. 18 is a schematic diagram illustrating further details of an exemplary customer agent providing a system in a customer computer to create consumable orders and/or to verify usage of consumables from approved sources in document processing device registered to an account managed by the account manager system of FIG. 1.
Figure 19:
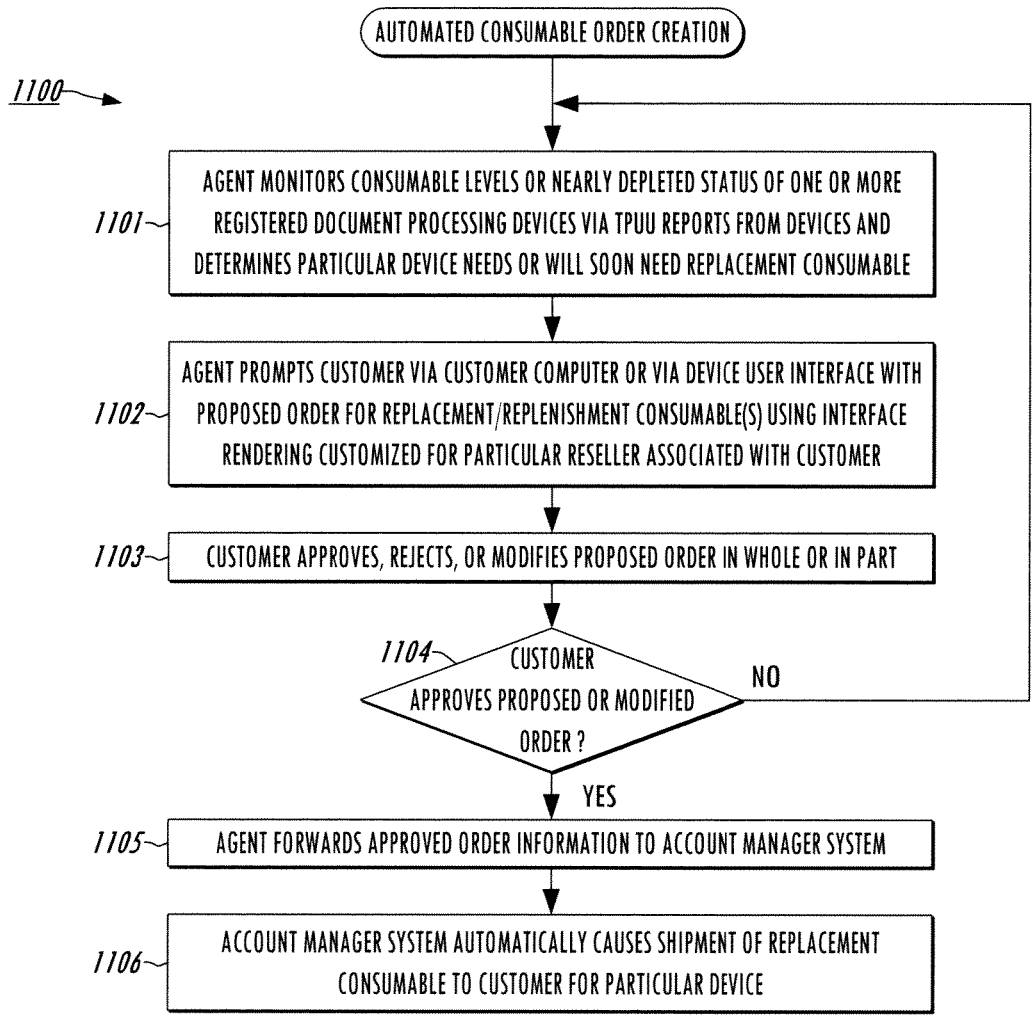
FIG. 19 is a flow diagram illustrating an exemplary method for generating consumable orders for document processing devices.
Figure 20:
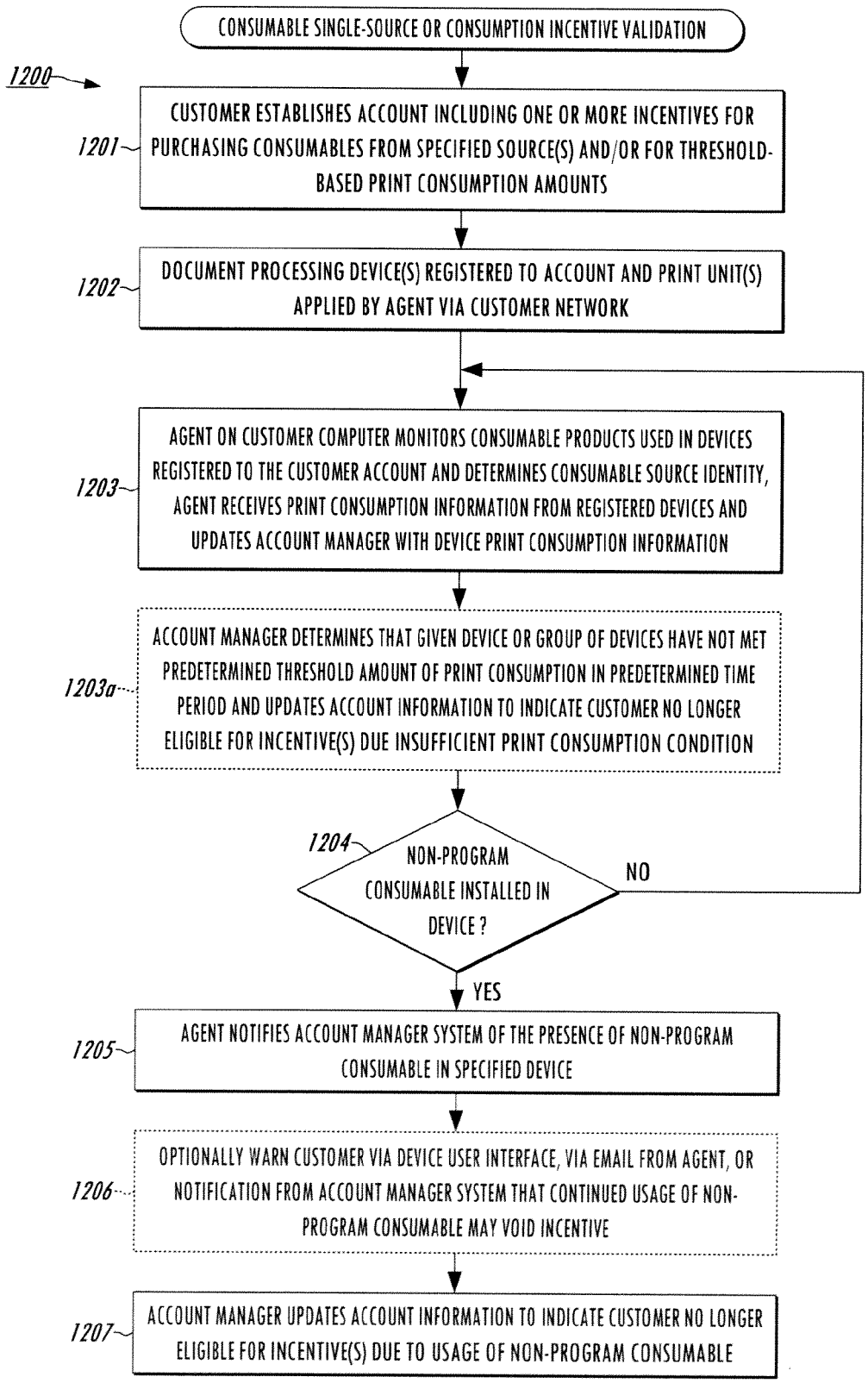
FIG. 20 is a flow diagram illustrating an exemplary method for verifying approved source consumable usage in document processing devices.

Referring now to FIGS. 18-20, FIG. 18 illustrates further details of the exemplary customer agent 360 in the customer computer 330a, which provides a system for creating consumable orders and/or for verifying usage of consumables from approved sources in one or more document processing devices 320 registered to an account managed by the account manager system 104. The order generation concepts illustrated and described below with respect to the agent 360 may be implemented in association with devices 320 operative based on applied print units as described above, as well as with devices 320 that do not operate on an applied print unit basis. In one exemplary implementation, the agent and components thereof may be an application program installed to execute on the customer computer 330a or may be implemented as hardware, processor-executed software, firmware, etc. on any hardware-inclusive platform having at least one processing element 330 operatively coupled with a network (e.g., customer network 302) to communicate with at least one document processing device 320 via the network 302. The agent 360 includes a consumable monitoring component 362 operable by the computer 330 to receive electronic reports from one or more document processing devices 320 via the network 302 and to determine whether a particular document processing device 320 needs or will soon need a replacement consumable 322 based at least partially on the electronic reports. In certain implementations involving print unit operated devices 320, the monitoring component 362 ascertains consumable supply levels via TPUU information sent by the devices 320. In other examples, the component 362 of the agent 360 receives dedicated messaging from the devices 320 reporting consumable supply levels and/or consumable status information from which the component 362 determines whether a replacement consumable 322 is or will soon be needed for a particular reporting device 320. The consumable monitoring component (362) in certain embodiments also receives print consumption information from the electronic reports and updates the account manager system 104 with device print consumption information, which the account manager 104 can then use to ascertain whether or not the customer is in compliance with minimum usage requirements established for incentive eligibility for a given account.

The agent system 360 in certain embodiments also includes an order generation component 364 operable by the processing element of the computer 330 to selectively prompt a user to place a proposed order for a replacement consumable 322 based on the determination of the consumable monitoring component 362. In the illustrated example, moreover, the order generation component 364 renders order prompting content 366 associated with a particular reseller 200 when prompting the user to place a proposed order for a replacement consumable 322, and is operative to allow the particular reseller 200 to provide and/or modify the order prompting content 366. The prompting content 366 provides an indication of a particular reseller 200, such as logos or other identifiers. In this regard, the agent 360 may locally store prompting content 366 for more than one different resellers 200 for selective rendering to the customer, and the order generation component 364 employs content 366 for a particular reseller 200 for each proposed order prompting such that the user's ordering process is tailored to the reseller 200 with which the customer normally interacts for ordering the particular consumable item 322 needed. The order generation component 364 is also operable by the processing element 330 to allow the user to modify the proposed order in certain embodiments, for example, to add ordered items, modify proposed order items, change quantities, to select shipping options, and to generally adjust any order parameters normally selectable by the user in placing an order. Once the user has chosen to proceed with a proposed or modified order, the order generation component 364 provides corresponding order information to the account manager system 104 via the network 302 for placing an order for a replacement consumable 322. In practice, the account manager system 104 can then process the order, typically in some form of cooperative arrangement with the pertinent reseller 200, with the consumable product(s) 322 being shipped to the customer 200 from a consumable manufacturer 370 (FIG. 18) or distributor 372 under the direction of the account manager system 104.

In operation, the system 360 provides timely notice to the customer of the need for upcoming consumable orders and arranges the necessary ordering details in a reseller-tailored presentation for easy acceptance, without the need for intervention or oversight by personnel of the account manager operation, the reseller 200, manufacturer 370 or of the distributor 372. This system 360 also helps prevent the customer having to pay expedited shipping costs normally incurred when the customer waits until a consumable supply is depleted before ordering, and lets the end customer operate their business activates without having to store and manage an inventory of replacement consumables 322 and without having to monitor consumable supply levels in devices associated with an account. In addition, the provision of reseller-specific prompting helps maintain and enhance pre-established customer relations with their reseller 200.

FIG. 19 depicts an exemplary method 1100 for generating consumable orders for document processing devices 320 which may be implemented in the customer agent system 360, for example, on a customer computer 330a as shown in FIG. 18 above. The method 1100 includes communicating with at least one document processing device 320 via a network 302, in which the agent monitors consumable levels and/or related status indications of devices 320 at 1101 in FIG. 19, such as by receiving electronic reports via a network 302 including TPUU values or other information from which a determination can be made as to whether a particular device 320 needs or will soon need a replacement consumable 322. Using a customer computer 330, the agent 360 prompts the customer at 1102 (e.g., via a display screen or interface of the customer computer or an interface 329 of the device 320 with a proposed order for one or more replacement/replenishment consumables 322, preferably using content rendered according to a particular reseller 200 associated with the customer. The user is thus selectively prompted at 1102 to place a proposed order if the particular document processing device 320 needs or will soon need a replacement consumable 322. At 1103, the customer can selectively approve or reject the order proposed by the system 360, or may modify one or more order parameters. A determination is made at 1104 as to whether the customer has approved of a proposed or modified order, and in response to a user choice to proceed with an order (YES at 1104), the process 1100 includes using the customer computer 330 to provide order information at 1105 to the account manager system 104 via the network 302 for placing an order for a replacement consumable 322. At 1106, the account manager system 104 automatically causes the order fulfillment and shipment of the consumable 322 to the customer, whether directly, or indirectly including selective involvement by pre-arranged business relationships with the distributor 372 (FIG. 18).

The agent system 360 can thus monitor the networked document processing devices 320, for example, through SNMP to determine if a consumable supply is low. This leads to the customer receiving a message, such as an email from the computer 330a or other prompting to facilitate timely ordering of replenishment supplies, with the order being automatically processed once the customer accepts a proposed or modified order. In some implementations, if the user accepts the proposed order, a single-click type order processing operation is achieved such that the user need not spend any excess time. Moreover, the customer experience is tailored according to the specifics of the reseller, so that the customer can confidently interact with a known source for ordering supplies. In one implementation, the agent system 360 is implemented by the customer installing an agent application 360 onto their computer 330a, which can be done as part of the initiation of a management account with the customer, along with purchase/lease of one or more registered devices 320 as described above. The reseller will interact with the account manager system 104 to establish arrangements for monitoring, pricing, definition and modification of rendered content 366, etc. The reseller 200 may also specify or select a distributor 372 for handling such orders from a set of distributors approved by the account manager system 104, and may specify selection criteria between multiple approved distributors 372 to handle inventory level decisions when a customer decides to place an order. The manufacturer 370 of a given consumable item 322 may sell supplies to distributors 372 with the distributor 372 then shipping the product 322 to the customer. The reseller 200, moreover, can interface with the account manager system 104 with establishment of a reseller account and the resellers 200 can thus select account manger approved distributors 372 they want to work with and can set their pricing in the system 104. The customer thus essentially sees what the reseller 200 has set up for consumable ordering via the reseller-branded client tool provided by the agent 360 that resides on the customer computer 330a.

When the customer agrees to a proposed/modified order, the agent 360 sends the order information to the account manager system 104, which then sends an order to the reseller 200. The reseller 200 can review and approve the order, and may selectively pass that order through the account manager system 104, which then relays the approved order to the distribution channel that was selected by the reseller 200. If a first distributor 372 is out of stock, the order is sent to a second selected/approved distributor 372 if the reseller accounts are thus defined. In one possible scenario, where the resellers 200 do not hold inventory, the manufacturer 370 or distributor 372 may directly ship the ordered item 322 to the customer. The customer payment, moreover, can be pre-arranged (e.g., credit account) through the account manager system 104, for instance, with a merchant ID parameter indicating the selected reseller 200, whereby the agent 360 and the account manager 104 provide a value add service to the reseller 200.

Referring now to FIGS. 18 and 20, in certain embodiments, the consumable monitoring component 362 is operable by the customer computer 330a to determine whether a given device 320 is using a non-program consumable 322 based in whole or in part on the electronic reports received from the devices 320, and to notify the account manager system 104 via the network that the device 320 is using a non-program consumable 322 from a source not associated with the customer account. In this manner, the account manager system 104 can oversee the eligibility of the customer for program incentives or offerings contingent upon the customer purchasing consumable supplies 322 only from certain program-approved sources (e.g., "program consumables"). This operation is shown in the method 1200 of FIG. 20, which may be implemented by the agent system 360. The method 1200 includes establishment at 1201 of a customer account which specifies one or more incentives to the customer contingent upon the customer using program-consumables 322 for one or more specified devices 320, and registration and provisioning of one or more program devices 320 at 1202. In certain implementations, the customer account may offer one or more program incentives for minimum device usage (print consumption) in a specified time period, which provisions are established at 1201.

At 1203, the agent 360 on the customer computer 330a communicates with at least one document processing device 320 via a network 302 and monitors the consumables 322 thereof, such as by receiving electronic reports from the device 320 via a network 302. The monitoring at 1203, moreover, includes determining the source of the consumables 322, for example, by obtaining consumable ID information 322id from a CRUM memory 322c read by the host device 320 (FIG. 18), and/or by the device 320 prompting the customer for entry of consumable ID information upon installing the consumable 322, and/or by the device otherwise ascertaining whether or not the consumable 322 is from an approved source, such as by detecting the presence or absence of certain structural elements of a consumable (e.g., solid ink stick) or other suitable technique from which the device 320 determines the propriety/acceptability of the consumable 322 for purposes of customer compliance with account/program incentive conditions. The reports (or other electronic reports from the devices, whether prompted or initiated by the devices 320, may also include data or information indicating print consumption, which is received by the agent 360 at 1203, with the agent updating the account manager system 104 with device print consumption information. In some embodiments, the account manager system 104 determines at 1203a whether a given device 320 or predefined group of devices 320 have not met a predetermined threshold amount of print consumption in a predetermined time period, and if not, updates the account information 110 to indicate the customer no longer qualifies for one or more incentive benefits conditioned upon minimum print consumption parameters for a given account.

At 1204, the agent 360 determines whether a consumable 322 in the particular document processing device 320 is from a source not associated with the customer account based at least partially on the electronic reports from the device 320. If the consumable source is an approved source (NO at 1204), the monitoring continues at 1203. Otherwise (YES at 1204 indicating that the device 320 is using a consumable 322 from a source not associated with the customer account), the agent 360 uses the customer computer 330l to selectively notify the account manager system 104 via the network 302 at 1205 that the particular document processing device 320 is using a non-program consumable 322. In certain embodiment, the process 1200 further includes warning the user at 1206 that continued usage of the consumable 322 from a source not associated with the customer account may void eligibility for at least one program incentive, such as via an email or other notification via the customer computer 330a. At 1207, the account manager system 104 updates the account information 110, such as by selectively changing the customer's eligibility for specified single source or approved source consumable incentives 110a (FIG. 18). Any enforcement actions can be taken by the account manager system 104 according to the conditions arranged with the customer, wherein the account manager system 104 may notify the customer (e.g., via the agent 360) that the situation must be remedied within a certain time period (e.g., such as by replacing the non-program consumable 322 with a program-consumable 322) to retain (or regain) eligibility for the incentives 110a.

In accordance with further aspects of the present disclosure, a non-transitory computer readable medium or media is provided, such as a computer memory, a memory within the server 100 or other computer-accessible memory such as a CD-ROM, floppy disk, flash drive, database, server, computer, etc. which has computer executable instructions for performing one or more of the processes disclosed above.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software or firmware, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A system for generating consumable orders for document processing devices, the system comprising:
   a customer computer including a tangible processing element operatively coupled with a network to communicate with at least one document processing device via the network, the device being registered to a customer account managed by an account manager system;
   a consumable monitoring component implemented in the customer computer and operable by the processing element to receive electronic reports from at least one document processing device via the network, the consumable monitoring component operable by the processing element to determine whether a particular document processing device needs or will soon need a replacement consumable based at least partially on the electronic reports; and
   a data store implemented in the customer computer and operative to store order prompting content associated with a plurality of different resellers;
   an order generation component implemented in the customer computer and operable by the processing element to selectively render order prompting content from the data store associated with a specific one of the plurality of resellers to prompt a user to place a proposed order for a replacement consumable if the consumable monitoring component determines that the particular document processing device needs or will soon need a replacement consumable, the order generation component being operable by the processing element in response to a user choice to proceed with an order, to provide order information to an account manager system for placing an order for a replacement consumable via the network.

2. The system of claim 1, where the order generation component is operable by the processing element to render the specific one of the plurality of resellers order prompting content stored in the data store of the customer computer associated with a specific one of the plurality of resellers when prompting the user to place a proposed reseller specific order for a replacement consumable.

3. The system of claim 2, where the order generation component is operable by the processing element to allow the specific one of the plurality of resellers to provide reseller specific order prompting content stored in the data store of the customer computer.

4. The system of claim 3, where the order generation component is operable by the processing element to allow the user to modify the proposed order in the customer computer.

5. The system of claim 2, where the order generation component is operable by the processing element to allow the user to modify the proposed order in the customer computer.

6. The system of claim 2, where the consumable monitoring component is operable by the processing element to determine whether the particular document processing device is using a consumable from a source not associated with the customer account based at least partially on the electronic reports from the particular document processing device, and if so, to notify the account manager system via the network that the particular document processing device is using a consumable from a source not associated with the customer account.

7. The system of claim 2, where the order generation component is operable by the processing element to allow the specific one of the plurality of resellers to modify the reseller specific order prompting content stored in the data store of the customer computer.

8. The system of claim 1, where the consumable monitoring component is operable by the processing element to determine whether the particular document processing device is using a consumable from a source not associated with the customer account based at least partially on the electronic reports from the particular document processing device, and if so, to notify the account manager system via the network that the particular document processing device is using a consumable from a source not associated with the customer account.

9. The system of claim 1, where the order generation component is operable by the processing element to allow the user to modify the proposed order in the customer computer.

10. The system of claim 1, where the order generation component is operable by the processing element to render a reseller tailored presentation from the data store when prompting the user to place a proposed order for a replacement consumable.

11. The system of claim 1, wherein the order generation component employs reseller specific order prompting content from the data store for the specific one of the plurality of resellers having a pre-established relationship for ordering the replacement consumables.

12. A system for verifying approved source consumable usage in document processing devices, the system comprising:
    a tangible processing element operatively coupled with a network to communicate with at least one document processing device via the network, the device being registered to a customer account managed by an account manager system; and
    a consumable monitoring component operable by the processing element to receive electronic reports from at least one document processing device via the network, the consumable monitoring component operable by the processing element to determine whether a particular document processing device is using a consumable from a source not associated with the customer account based at least partially on the electronic reports from the particular document processing device, and if so, to notify the account manager system via the network that the particular document processing device is using a consumable from a source not associated with the customer account.

13. The system of claim 12, further comprising an order generation component implemented in a customer computer and operable by the processing element to render order prompting content associated with a particular one of a plurality of resellers from a data store of the customer computer when prompting a user to place a proposed reseller specific order for a replacement consumable.

14. The system of claim 12, where the consumable monitoring component is operable by the processing element, if the consumable monitoring component determines the particular document processing device is using a consumable from a source not associated with the customer account, to warn the user that continued usage of the consumable from a source not associated with the customer account may void eligibility for at least one program incentive.

15. The system of claim 12, where the consumable monitoring component is further operable by the processing element to receive print consumption information from the electronic reports and to update the account manager system with device print consumption information.

16. A method for generating consumable orders for document processing devices, the method comprising:
communicating with at least one document processing device via a network, the device being registered to a customer account managed by an account manager system;
receiving electronic reports from the at least one document processing device via a network;
determining whether a particular document processing device needs or will soon need a replacement consumable based at least partially on the electronic reports;
using a data store implemented in a customer computer, storing order prompting content associated with a plurality of different resellers;
using the customer computer, selectively prompting a user to use the order prompting content associated with a specific one of the plurality of different resellers to place a proposed order for a replacement consumable if the particular document processing device needs or will soon need a replacement consumable;
in response to a user choice to proceed with an order, using the customer computer, providing order information to the account manager system via the network for placing an order for a replacement consumable.

17. The method of claim 16, further comprising allowing the specific one of the plurality of resellers to modify the reseller specific order prompting content stored in the data store of the customer computer.

18. The method of claim 16, further comprising allowing the specific one of the plurality of different resellers to provide reseller specific order prompting content stored in the data store of the customer computer.

19. The method of claim 18, further comprising allowing the user to modify the proposed order stored in the data store of the customer computer.

20. The method of claim 16, further comprising allowing the user to modify the proposed order stored in the data store of the customer computer.

21. The method of claim 16, further comprising:
determining whether the particular document processing device is using a consumable from a source not associated with the customer account based at least partially on the electronic reports from the particular document processing device; and
if the particular document processing device is using a consumable from a source not associated with the customer account, using a customer computer, selectively notifying the account manager system via the network that the particular document processing device is using a consumable from a source not associated with the customer account.

22. The method of claim 21, further comprising, if the consumable monitoring component determines the particular document processing device is using a consumable from a source not associated with the customer account, warning the user via a customer computer that continued usage of the consumable from a source not associated with the customer account may void eligibility for at least one program incentive.

23. The method of claim 16, further comprising allowing the user to modify the proposed order in the customer computer.

24. The method of claim 16, further comprising:
determining whether the particular document processing device is using a consumable from a source not associated with the customer account based at least partially on the electronic reports from the particular document processing device; and
if the particular document processing device is using a consumable from a source not associated with the customer account, using a customer computer, selectively notifying the account manager system via the network that the particular document processing device is using a consumable from a source not associated with the customer account.

25. The method of claim 24, further comprising, if the consumable monitoring component determines the particular document processing device is using a consumable from a source not associated with the customer account, warning the user via a customer computer that continued usage of the consumable from a source not associated with the customer account may void eligibility for at least one program incentive.

26. A method for verifying approved source consumable usage in document processing devices, the method comprising:
communicating with at least one document processing device via a network, the device being registered to a customer account managed by an account manager system;
receiving electronic reports from the at least one document processing device via a network;
determining whether the particular document processing device is using a consumable from a source not associated with the customer account based at least partially on the electronic reports from the particular document processing device; and
if the particular document processing device is using a consumable from a source not associated with the customer account, using a customer computer, selectively notifying the account manager system via the network that the particular document processing device is using a consumable from a source not associated with the customer account.

27. The method of claim 26, further comprising, if the consumable monitoring component determines the particular document processing device is using a consumable from a source not associated with the customer account, warning the user via a customer computer that continued usage of the consumable from a source not associated with the customer account may void eligibility for at least one program incentive.

28. The method of claim 26, further comprising:
receiving print consumption information from the electronic reports;
updating the account manager system with device print consumption information.

29. The method of claim 26, further comprising rendering order prompting content associated with a specific one of a plurality of resellers from a data store of a customer computer when prompting a user to place a proposed reseller specific order for a replacement consumable.

* * * * *